United States Patent
Fujii

(10) Patent No.: US 11,486,544 B2
(45) Date of Patent: Nov. 1, 2022

(54) HIGH-PRESSURE TANK, VEHICLE INCLUDING HIGH-PRESSURE TANK, AND METHOD FOR MANUFACTURING HIGH-PRESSURE TANK

(71) Applicant: TOYOTA JIDOSHA KABUSHIKI KAISHA, Toyota (JP)

(72) Inventor: Manabu Fujii, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 85 days.

(21) Appl. No.: 17/024,924

(22) Filed: Sep. 18, 2020

(65) Prior Publication Data

US 2021/0123566 A1    Apr. 29, 2021

(30) Foreign Application Priority Data

Oct. 25, 2019 (JP) .............................. JP2019-194366

(51) Int. Cl.
*F17C 1/06* (2006.01)
*F17C 1/16* (2006.01)
*F17C 13/08* (2006.01)

(52) U.S. Cl.
CPC .................. *F17C 1/06* (2013.01); *F17C 1/16* (2013.01); *F17C 13/084* (2013.01); *F17C 2201/0109* (2013.01); *F17C 2203/0604* (2013.01); *F17C 2203/0663* (2013.01); *F17C 2270/0184* (2013.01)

(58) Field of Classification Search
CPC ...... F17C 1/06; F17C 1/16; F17C 2201/0109; F17C 2203/0604

USPC .......................................................... 220/581
See application file for complete search history.

(56) References Cited

U.S. PATENT DOCUMENTS

| | | | |
|---|---|---|---|
| 6,196,271 B1 * | 3/2001 | Braun .................. | F16L 55/1654 264/516 |
| 9,266,642 B2 * | 2/2016 | Prakash .................. | B21C 19/00 |
| 9,851,042 B2 * | 12/2017 | Daveloose .......... | F16L 55/1656 |
| 9,874,311 B2 * | 1/2018 | Morales .................... | F17C 1/14 |

(Continued)

FOREIGN PATENT DOCUMENTS

| CN | 101999054 A | 3/2011 |
|---|---|---|
| CN | 102285314 A | 12/2011 |

(Continued)

OTHER PUBLICATIONS

Boegger Industrial Limited, Crimped Woven Wire Mesh—Different Weaving Method and Application, https://web.archive.org/web/20180123103756/http://www.wovenwirecloth.org:80/wovenwire/crimped-woven-wire-mesh.html (Year: 2018).*

*Primary Examiner* — John K Fristoe, Jr.
*Assistant Examiner* — Laura E. Parker
(74) *Attorney, Agent, or Firm* — Dickinson Wright, PLLC

(57) ABSTRACT

A high-pressure tank includes a liner, a fiber layer, and a protective layer. The liner has an internal space to store a fluid. The fiber layer includes fibers wound around an outer surface of the liner, and a thermosetting resin that has been cured and covers surfaces of the fibers. The protective layer includes a porous member disposed on the fibers, the porous member having a plurality of pores extending through the porous member in a thickness direction of the porous member. The thermosetting resin has entered the pores.

2 Claims, 17 Drawing Sheets

(56) References Cited

U.S. PATENT DOCUMENTS

| | | | |
|---|---|---|---|
| 2004/0242095 A1* | 12/2004 | Prakash | B32B 15/043 |
| | | | 442/7 |
| 2011/0303662 A1 | 12/2011 | Handa | |
| 2015/0292677 A1* | 10/2015 | Curless | B29C 70/86 |
| | | | 156/86 |
| 2018/0180222 A1 | 6/2018 | Ueda et al. | |
| 2018/0259125 A1* | 9/2018 | Cousigne | F17C 1/005 |
| 2019/0120435 A1* | 4/2019 | Lanzl | F17C 1/02 |

FOREIGN PATENT DOCUMENTS

| | | |
|---|---|---|
| JP | 2018100768 A | 6/2018 |
| WO | 2009128971 A1 | 10/2009 |

\* cited by examiner

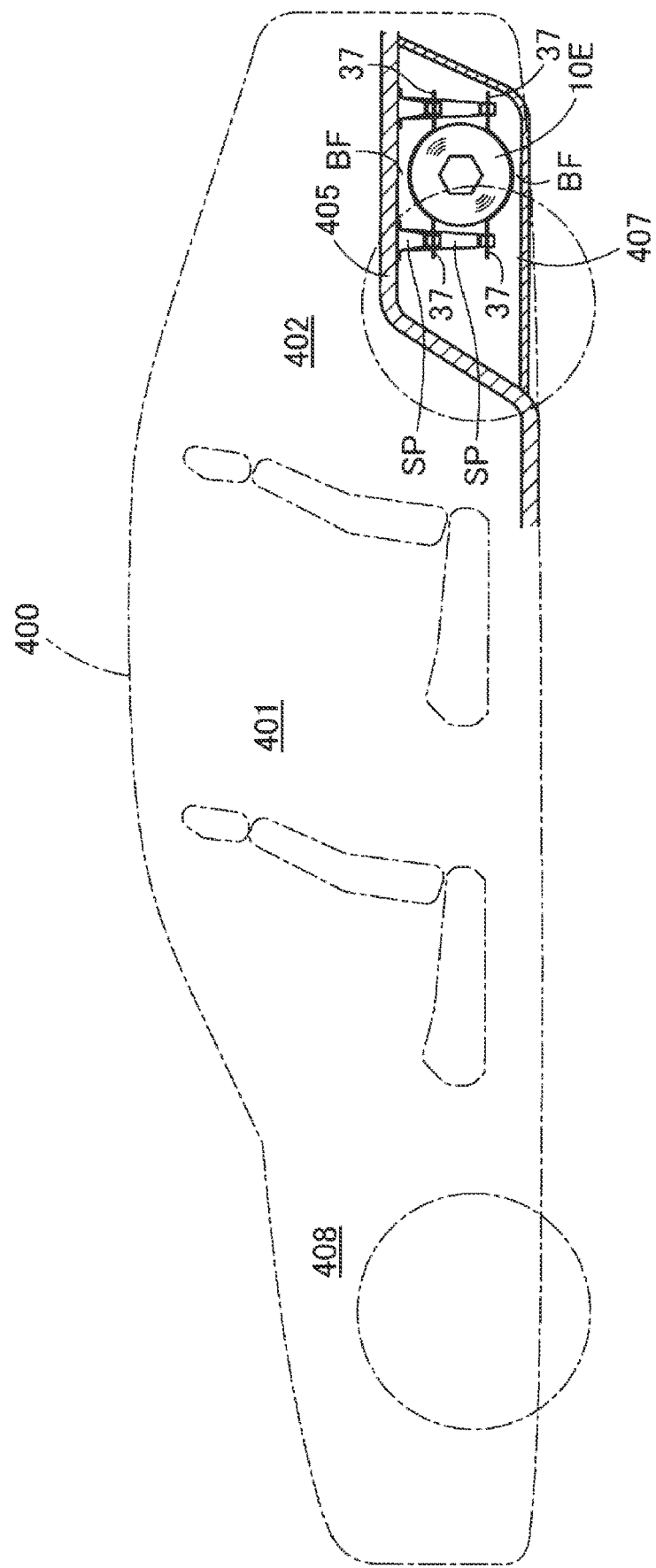

HIGH-PRESSURE TANK, VEHICLE INCLUDING HIGH-PRESSURE TANK, AND METHOD FOR MANUFACTURING HIGH-PRESSURE TANK

INCORPORATION BY REFERENCE

The disclosure of Japanese Patent Application No. 2019-194366 filed on Oct. 25, 2019 including the specification, drawings and abstract is incorporated herein by reference in its entirety.

BACKGROUND

1. Technical Field

The present disclosure relates to a high-pressure tank, a vehicle including the high-pressure tank, and a method for manufacturing the high-pressure tank.

2. Description of Related Art

There is a high-pressure tank having a fiber layer including fibers wound around the surface of a liner, and a thermosetting resin that is thermally cured. For example, Japanese Unexamined Patent Application Publication No. 2018-100768 (JP 2018-100768 A) discloses a high-pressure tank having a reinforcing layer formed of the fiber layer, and a protective layer made of a glass fiber reinforced plastic and formed on the reinforcing layer. With the glass fiber reinforced plastic, the protective layer can be formed to have a high shock resistance. Therefore, the durability of the high-pressure tank can be increased. With the protective layer made of the glass fiber reinforced plastic, deterioration of the high-pressure tank can visually be checked easily based on, for example, discoloration caused by damage. Thus, it is possible to appropriately determine a timing of replacement to be needed due to the deterioration of the high-pressure tank.

SUMMARY

When the protective layer that protects the fiber layer of the high-pressure tank is made of the glass fiber reinforced plastic as described above, a process of winding fibers serving as the fiber layer and then winding glass fibers impregnated with the thermosetting resin is provided in general. Therefore, the process for manufacturing the high-pressure tank may be complicated, or manufacturing costs may increase. In the high-pressure tank, it is desirable that the protective layer that facilitates the check on the deterioration of the high-pressure tank can be formed more easily while increasing protectiveness of the fiber layer.

The technology disclosed herein can be implemented in the following aspects.

A first aspect of the present disclosure relates to a high-pressure tank. The high-pressure tank includes a liner, a fiber layer, and a protective layer. The liner has an internal space to store a fluid. The fiber layer includes fibers wound around an outer surface of the liner, and a thermosetting resin that has been cured and covers surfaces of the fibers. The protective layer includes a porous member disposed on the fibers, the porous member having a plurality of pores extending through the porous member in a thickness direction of the porous member. The thermosetting resin has entered the pores.

According to the first aspect, the protective layer having a simple structure in which the protective layer is integrated with the fiber layer by causing the thermosetting resin of the fiber layer to enter the pores can be formed on the fiber layer using the porous member. Therefore, the durability of the fiber layer can be increased. This protective layer can be formed by arranging the porous member on the fibers. Therefore, the protective layer can be formed more easily than a protective layer formed by winding a glass fiber resin impregnated with the thermosetting resin.

In the first aspect, the porous member may include a tubular mesh member having a mesh that defines the pores and surrounding an outer periphery of the liner.

In the aspect described above, the tubular mesh member may have a stretching property in which a restoration force is generated when the tubular mesh member is stretched.

According to the structure described above, the protective layer can follow expansion and contraction of the high-pressure tank because the tubular mesh member has the stretching property. Thus, it is possible to suppress deterioration of the protective layer due to repeated expansion and contraction of the high-pressure tank. In the process for manufacturing the high-pressure tank, the tubular mesh member is attached to the outer periphery of the liner in a stretched state in which the restoration force is generated. Therefore, the tubular mesh member can be brought into close contact with the fibers of the fiber layer by the restoration force. Thus, the degree of close contact between the fiber layer and the protective layer can be increased, and separation of the fiber layer and the protective layer can be suppressed. In addition, the tubular mesh member can easily be arranged in the process for manufacturing the high-pressure tank. Thus, the manufacturing costs of the high-pressure tank can be reduced.

In the aspect described above, the porous member may include a sheet mesh member having a mesh that defines the pores and configured to stretch or contract by deformation of the mesh.

According to the structure described above, the protective layer includes the sheet mesh member that keeps its shape as a sheet shape. Therefore, the strength of the protective layer is increased. The sheet mesh member is stretchable or contractible by the deformation of the mesh. Therefore, the protective layer can follow the expansion and contraction of the high-pressure tank. Thus, it is possible to suppress deterioration of the protective layer due to repeated expansion and contraction of the high-pressure tank. Further, the sheet mesh member is arranged in a desired region of the high-pressure tank. Therefore, the protective layer can be formed in this region. This structure provides efficiency because the protective layer can easily be formed only in a region having need for protection.

In the aspect described above, the protective layer may include a first protective layer and a second protective layer arranged away from each other at positions where the first protective layer and the second protective layer face each other across a central axis of the high-pressure tank. According to the structure described above, the protective layers can be formed on respective sides across the central axis. Therefore, the protectiveness of the high-pressure tank can be increased.

In the aspect described above, the sheet mesh member may be provided with, at an end of the sheet mesh member, a fastener extending outward from a surface of the high-pressure tank and to be coupled to a support configured to support the high-pressure tank. According to the structure described above, the high-pressure tank can easily be fixed by the fastener integrated with the porous member of the protective layer.

In the aspect described above, the sheet mesh member may include a plurality of threads and a plurality of couplers each coupling ends of the threads. The threads and the couplers may define the pores.

In the aspect described above, each of the pores may have a rhomboid shape.

In the aspect described above, each of the threads may be bent into a crank shape.

In the aspect described above, each of the pores may have a shape corresponding to a shape in which ends of a plurality of ellipses arrayed in line in a major diameter direction are coupled together.

A second aspect of the present disclosure relates to a vehicle including the high-pressure tank in the aspect described above. The vehicle includes the support. The fastener extends to each of both sides across the central axis of the high-pressure tank. The high-pressure tank is supported by the support in a state in which buffer regions where the high-pressure tank is allowed to expand or contract are formed above and below the high-pressure tank.

According to the second aspect, the displacement of the high-pressure tank along with the expansion and contraction of the high-pressure tank is suppressed. This structure reduces the occurrence of a case where devices such as a valve connected to the high-pressure tank or devices arranged around the high-pressure tank receive loads caused by the expansion and contraction of the high-pressure tank.

A third aspect of the present disclosure relates to a method for manufacturing a high-pressure tank. The method for manufacturing the high-pressure tank includes preparing a liner having an internal space to store a fluid, preparing a porous member having a plurality of pores extending through the porous member in a thickness direction of the porous member, winding, around a surface of the liner, fibers impregnated with a thermosetting resin, arranging the porous member on the fibers, and thermally curing, by heating the liner having the porous member, the thermosetting resin impregnated in the fibers while causing the thermosetting resin to flow into the pores of the porous member.

According to the third aspect, the protective layer integrated with the fiber layer by the thermosetting resin can easily be provided by arranging the porous member on the fibers.

The technology disclosed herein may be implemented in various aspects other than the high-pressure tank and its manufacturing method. For example, the technology disclosed herein may be implemented in various aspects such as a fuel cell system including the high-pressure tank, a vehicle including the high-pressure tank, a method for forming the protective layer of the high-pressure tank, a device for manufacturing the high-pressure tank, and a structure for protecting the high-pressure tank.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 21 is a schematic view illustrating an example of a mounting position of the high-pressure tank in a fuel cell vehicle.

DETAILED DESCRIPTION OF EMBODIMENTS

First Embodiment

Figure 1:
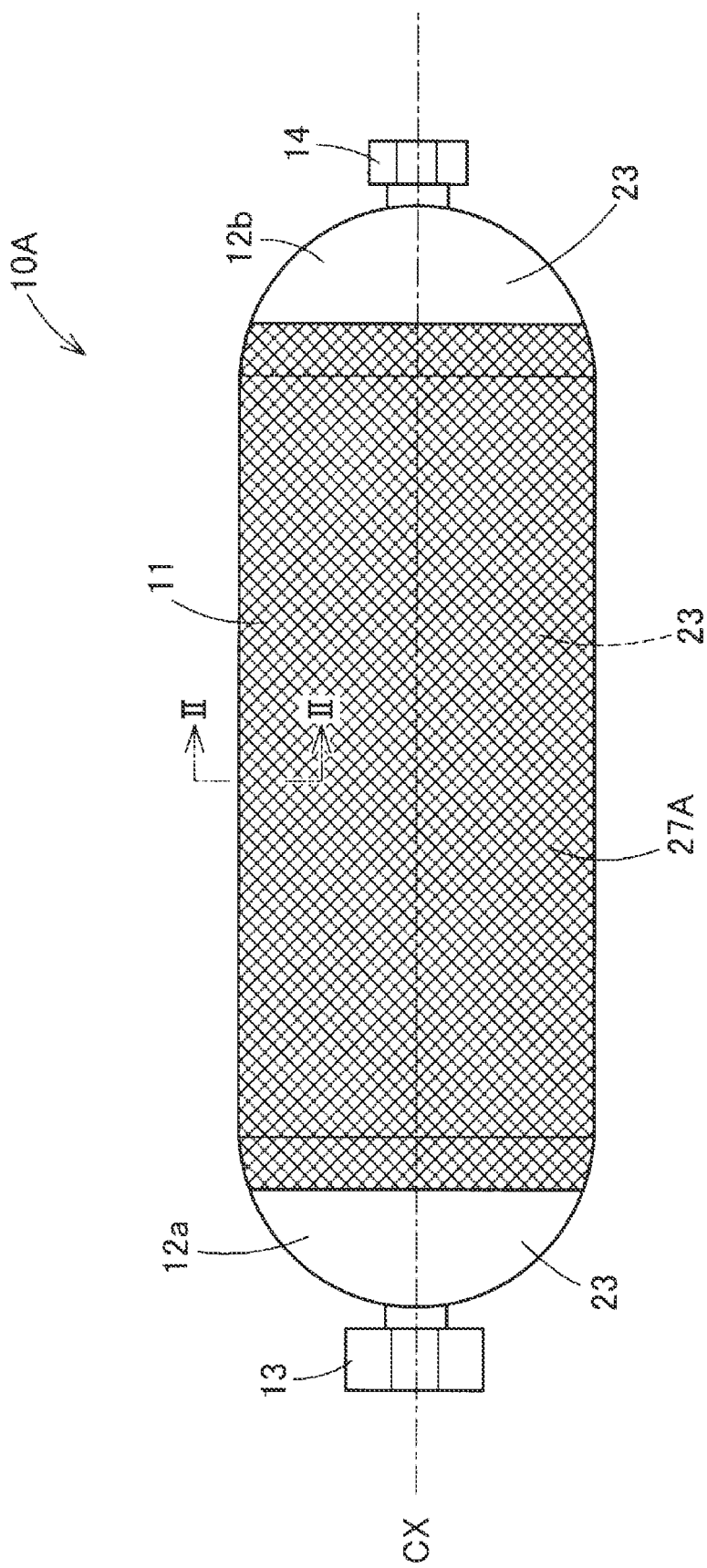
FIG. 1 is a schematic side view illustrating a high-pressure tank of a first embodiment.

FIG. 1 is a schematic side view illustrating a high-pressure tank 10A of a first embodiment. In FIG. 1, a central axis CX of the high-pressure tank 10A is represented by a long dashed short dashed line. The high-pressure tank 10A is a hollow container that stores a fluid. In the first embodiment, the high-pressure tank 10A is mounted on a fuel cell vehicle, and is used for storing fuel gas to be supplied to a fuel cell. In the first embodiment, the high-pressure tank 10A is filled with hydrogen under high pressure as the fuel gas of the fuel cell. The high-pressure tank 10A has a pressure resistance of 70 MPa or higher.

The high-pressure tank 10A has a cylinder 11 that has a substantially cylindrical shape and domes 12a and 12b that have a substantially hemispherical shape and provided at respective ends of the cylinder 11. Each of the domes 12a and 12b has an opening (not illustrated) at the apex. The opening communicates with an internal space of the high-pressure tank 10A. The opening at the top of the first dome 12a is hermetically closed by attaching a metal cap 13. A pipe is connected to the cap 13, and the fluid stored in the high-pressure tank 10A flows through the pipe. The cap 13 is provided with an on-off valve (not illustrated) and a fusible plug valve (not illustrated). The on-off valve controls the stored fluid to flow into or out of the high-pressure tank 10A. The fusible plug valve melts at a given temperature or higher to permit leakage of the fluid out of the high-pressure tank 10A. The opening at the apex of the second dome 12b is hermetically closed by attaching a metal plug member 14.

Figure 2:
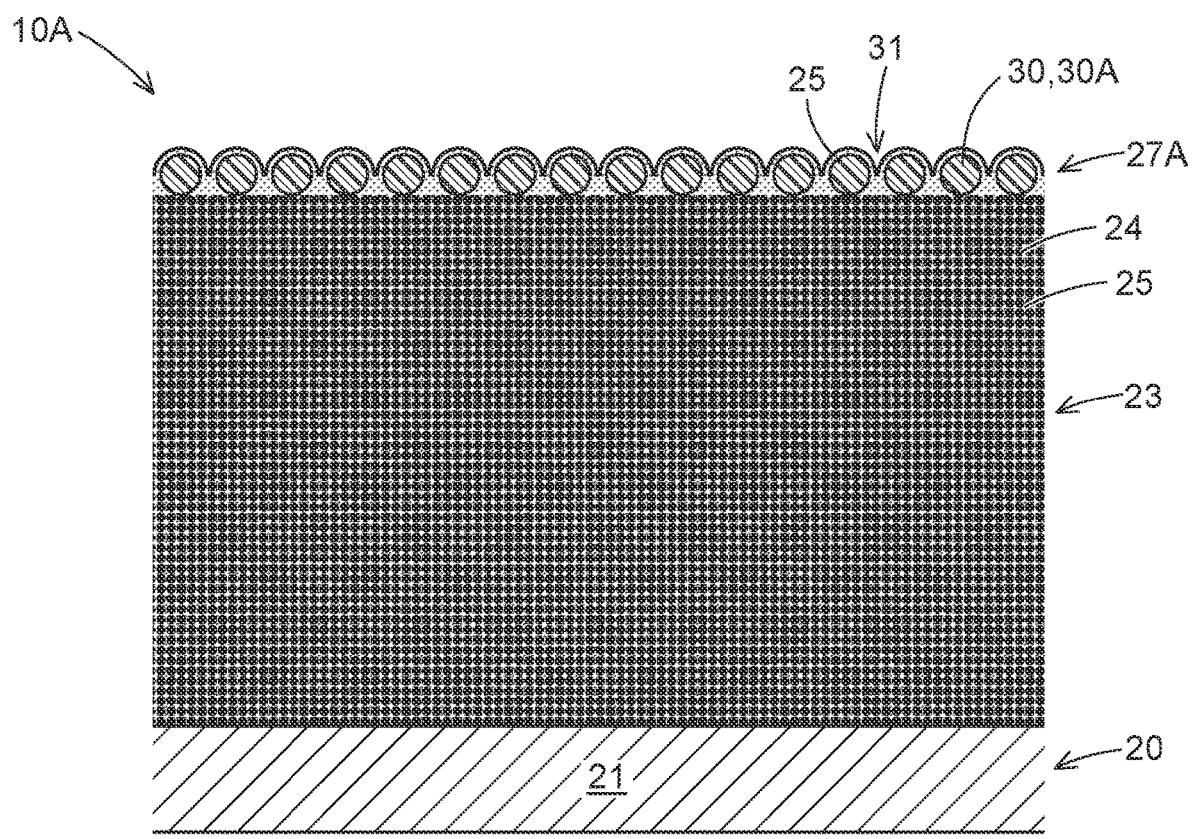
FIG. 2 is a schematic sectional view of the high-pressure tank of the first embodiment.

FIG. 2 is a schematic sectional view of the high-pressure tank 10A cut along a line II-II in FIG. 1. The high-pressure tank 10A has a liner 20 inside. The liner 20 is a hollow container serving as a body of the high-pressure tank 10A. The liner 20 has a wall 21 and an internal space 22. The wall 21 defines the cylinder 11 and the domes 12a and 12b. The internal space 22 is enclosed by the wall 21 to store the fluid. In the first embodiment, the liner 20 is made of a resin. For example, the liner 20 is manufactured by rotational molding using a reinforced plastic. In other embodiments, the liner 20 may be made of a light metal such as an aluminum alloy in place of the resin.

A fiber layer 23 and a protective layer 27A are stacked on the surface of the wall 21 of the liner 20. The fiber layer 23 is formed by filament winding using the liner 20 as a mandrel to cover the entire outer surface of the liner 20. The fiber layer 23 includes fibers 24 and a thermosetting resin 25. The fibers 24 are wound around the entire outer surface of the liner 20 to form a plurality of stacked wound layers. The thermosetting resin 25 is thermally cured while covering the surfaces of the fibers 24 and binding the fibers 24 together. In the first embodiment, the fiber layer 23 is made of a carbon fiber reinforced plastic (CFRP). The fiber 24 is a carbon fiber, and the thermosetting resin 25 is an epoxy resin. The thermosetting resin 25 is not limited to the epoxy resin, but may be other thermosetting resins such as an unsaturated polyester resin.

The fiber layer 23 covers the cylinder 11 and the domes 12a and 12b illustrated in FIG. 1. In the domes 12a and 12b, the cap 13 and the plug member 14 project from the fiber layer 23. Canopies (not illustrated) extending outward from central tube portions along the domes 12a and 12b of the liner 20 are covered with the fiber layer 23 such that the cap 13 and the plug member 14 are fixed to the liner 20.

As illustrated in FIG. 2, the protective layer 27A includes a porous member 30 disposed on the fibers 24 of the fiber layer 23, the porous member 30 having a plurality of pores 31 extending through the porous member 30 in its thickness direction. The plurality of pores 31 are arrayed over the entire part of the porous member 30. The porous member 30 is arranged over the entire protective layer 27A. In the first embodiment, the porous member 30 is a tubular mesh member 30A surrounding the liner 20 and having a mesh that defines the pores 31. As illustrated in FIG. 1, the tubular mesh member 30A of the first embodiment covers at least the cylinder 11, and also covers the lower ends of the domes 12a and 12b.

In other embodiments, the tubular mesh member 30A and the protective layer 27A may entirely cover the cylinder 11 and the domes 12a and 12b, or may partially cover the cylinder 11. Alternatively, the tubular mesh member 30A and the protective layer 27A may entirely or partially cover the domes 12a and 12b.

The tubular mesh member 30A has a stretching property in which a restoration force is generated when the tubular mesh member 30A is stretched. The tubular mesh member 30A is arranged in a stretched state, and is fitted to a superficial layer of the fibers 24 with the restoration force. The tubular mesh member 30A has a heat resistance with which the tubular mesh member 30A is not melted in a thermally curing step described later. The tubular mesh member 30A is a fiber member made of a resin such as nylon having a high heat resistance. More specifically, the tubular mesh member 30A is made of NETLON (registered trademark).

As illustrated in FIG. 2, the thermosetting resin 25 of the fiber layer 23 enters the pores 31 such that the tubular mesh member 30A is integrated with the fiber layer 23. The thermosetting resin 25 covers the entire tubular mesh member 30A.

In order that the fiber layer 23 can be protected from a foreign object such as a gravel stone to be brought into contact with the high-pressure tank 10A during use in the fuel cell vehicle, the size of the pore 31 of the tubular mesh member 30A is desirably smaller than the size of the foreign object. More specifically, the pore 31 of the tubular mesh member 30A may have a maximum width of about 0.1 to 10 mm.

Figure 3:
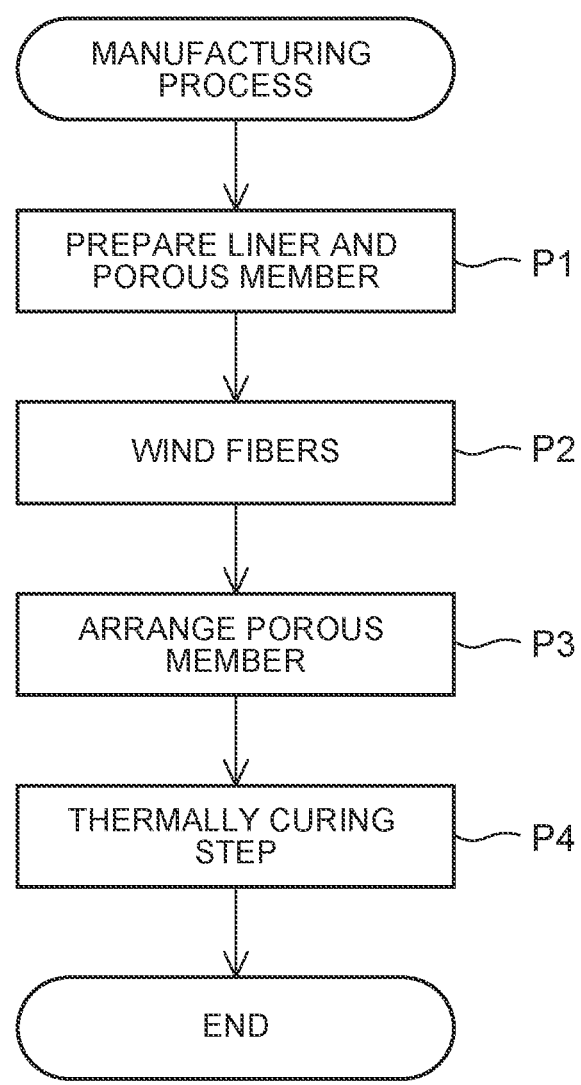
FIG. 3 is an explanatory drawing illustrating a flow of a process for manufacturing the high-pressure tank of the first embodiment.

FIG. 3 is an explanatory drawing illustrating a flow of a process for manufacturing the high-pressure tank 10A. In Step P1, the liner 20 and the porous member 30 are prepared. The cap 13 and the plug member 14 are attached to the openings of the domes 12a and 12b of the liner 20. In Step P2, the fibers 24 impregnated with an uncured thermosetting resin 25 are wound around the liner 20 into a helix or hoop by a filament winder. In Step P2, wound layers of the fibers 24 that cover the entire liner 20 are stacked. In Step P3, the porous member 30 prepared in Step P1 is arranged on the fibers 24. In the first embodiment, the tubular mesh member 30A is arranged on the fibers 24 as the porous member 30.

Figure 4:
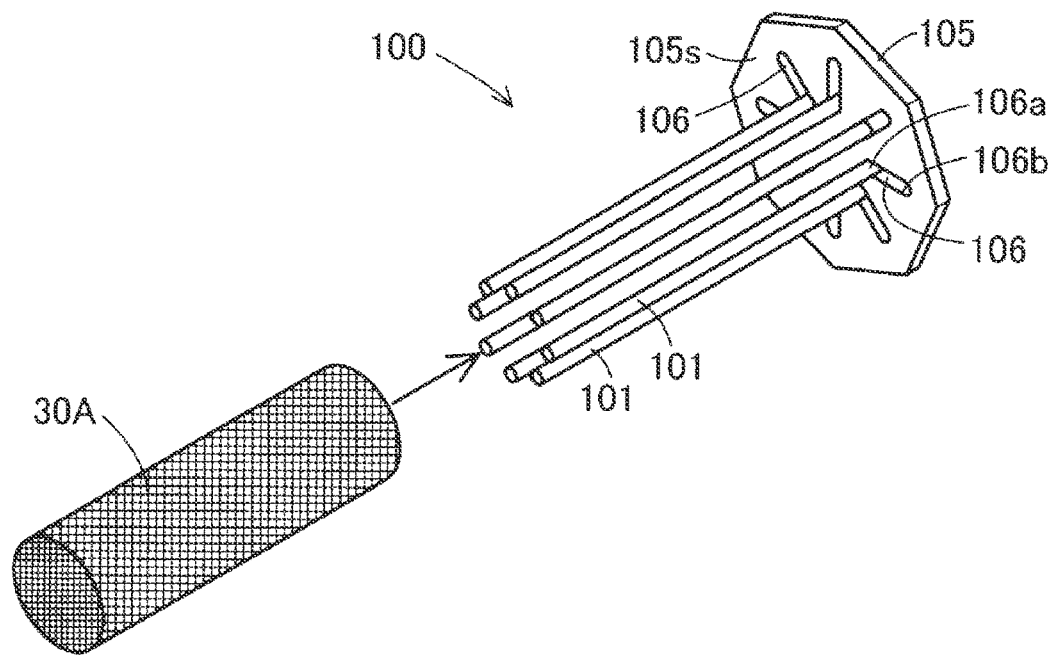
FIG. 4 is a schematic perspective view illustrating an attachment device configured to attach a tubular mesh member to a liner.

Details of Step P3 are described with reference to FIG. 4 to FIG. 8 in sequence. FIG. 4 is a schematic perspective view illustrating an attachment device 100 configured to attach the tubular mesh member 30A to the liner 20. The attachment device 100 includes a plurality of shafts 101 and a plate body 105 to which the shafts 101 are attached to extend in parallel. A plurality of grooves 106 is formed in a face 105s of the plate body 105. The grooves 106 extend from the center toward the outer periphery in the plate body 105, and are arrayed radially at regular intervals to surround the center of the plate body 105. An end of each groove 106 that is located closer to the center of the plate body 105 is hereinafter referred to as "first end 106a". An end of each groove 106 that is located closer to the outer periphery of the plate body 105 is hereinafter referred to as "second end 106b".

Each shaft 101 extends from the groove 106 in a direction perpendicular to the face 105s of the plate body 105. The shaft 101 is linearly movable along the groove 106 between the first end 106a and the second end 106b of the groove 106. The shaft 101 is moved by a gear mechanism (not illustrated) provided inside the plate body 105.

In the attachment device 100, the shafts 101 serve as retainers configured to retain the tubular mesh member 30A. The tubular mesh member 30A is attached to the attachment device 100 by inserting the shafts 101 into the tubular mesh member 30A in a state in which the shafts 101 are located at the first ends 106a.

Figure 5:
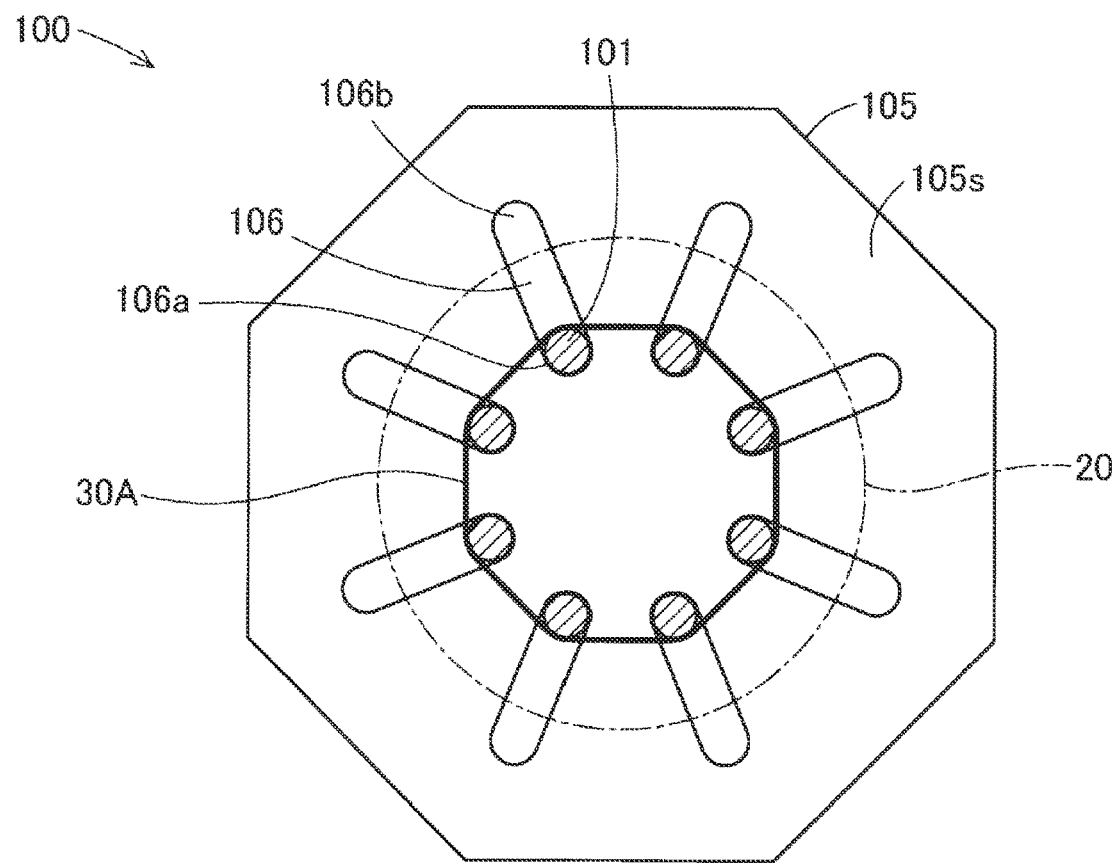
FIG. 5 is a schematic plan view of the attachment device in a state in which the tubular mesh member is attached.

FIG. 5 is a schematic plan view of the attachment device 100 in a state in which the tubular mesh member 30A is attached. In FIG. 5, an outer peripheral borderline of the liner 20 when the liner 20 is arranged such that the central axis of the liner 20 is located on a central axis of the plate body 105 is represented by a long dashed short dashed line for reference. The diameter of an imaginary circle (not illustrated) connecting the first ends 106a of the grooves 106 of the plate body 105 is larger than the diameter of the tubular mesh member 30A shaped into a cylinder without a stretch. The tubular mesh member 30A is looped around the shafts 101 while being stretched in a radial direction, and is retained by the shafts 101 in a state in which a restoration force is generated.

Figure 6:
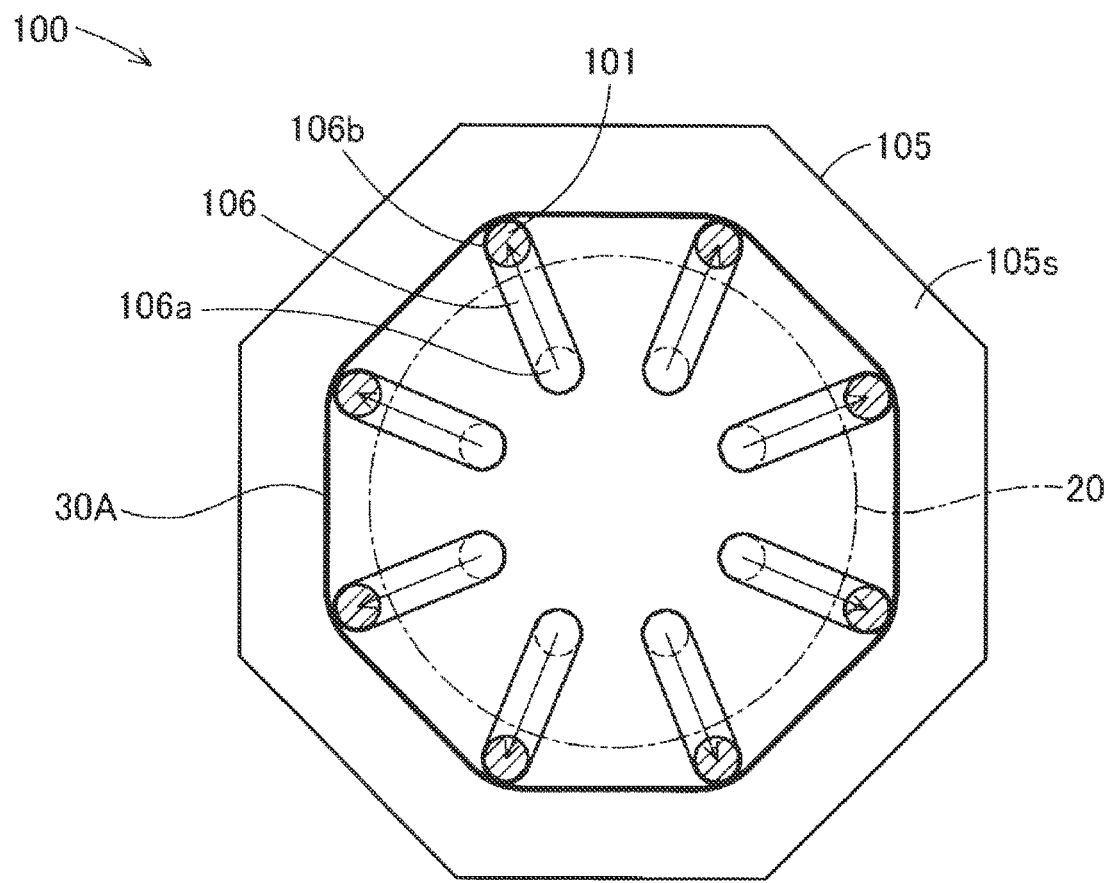
FIG. 6 is a schematic plan view illustrating the attachment device when the tubular mesh member is stretched.

FIG. 6 is a schematic plan view of the attachment device 100 when the attached tubular mesh member 30A is stretched by moving the shafts 101. The diameter of the imaginary circle (not illustrated) connecting the first ends 106a of the grooves 106 is smaller than the diameter of the liner 20. The diameter of an imaginary circle (not illustrated) connecting the second ends 106b of the grooves 106 is larger than the diameter of the liner 20. After the tubular mesh member 30A is attached, the shafts 101 are moved to the second ends 106b to stretch the tubular mesh member 30A. Therefore, the diameter of the tubular mesh member 30A is increased. Thus, a space for housing the liner 20 can be formed in the tubular mesh member 30A.

Figure 7:
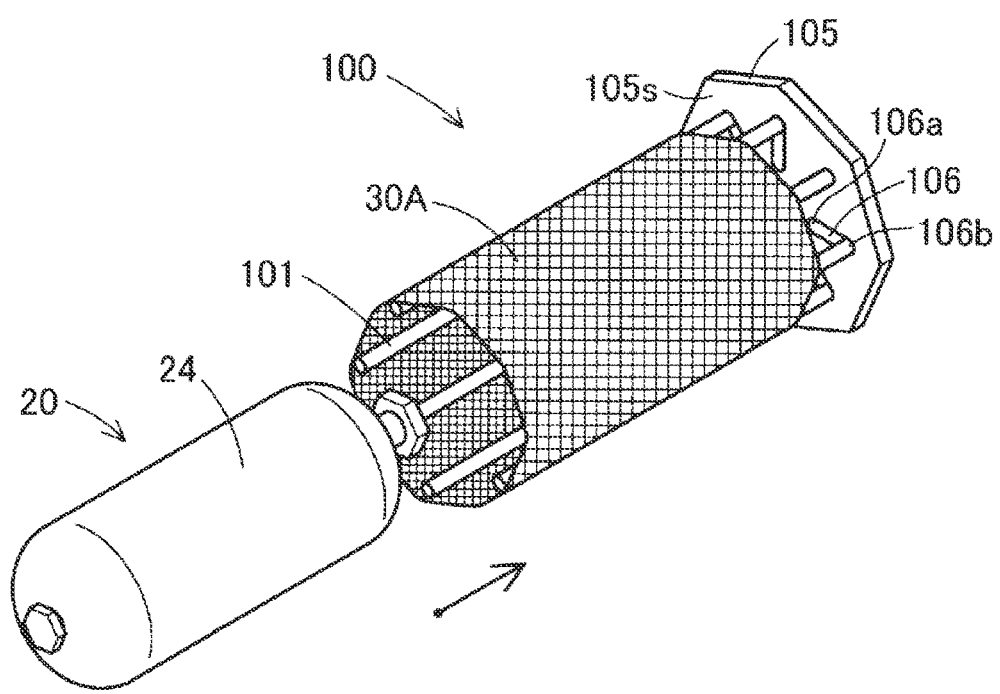
FIG. 7 is a schematic perspective view illustrating a step of inserting the liner into the tubular mesh member.

FIG. 7 is a schematic perspective view illustrating a step of inserting the liner 20 into the tubular mesh member 30A retained by the shafts 101 of the attachment device 100. The liner 20 having the fibers 24 wound in Step P2 is inserted along the central axis of the plate body 105 of the attachment device 100 into the tubular mesh member 30A of which diameter is increased by the attachment device 100 as illustrated in FIG. 6.

Figure 8:
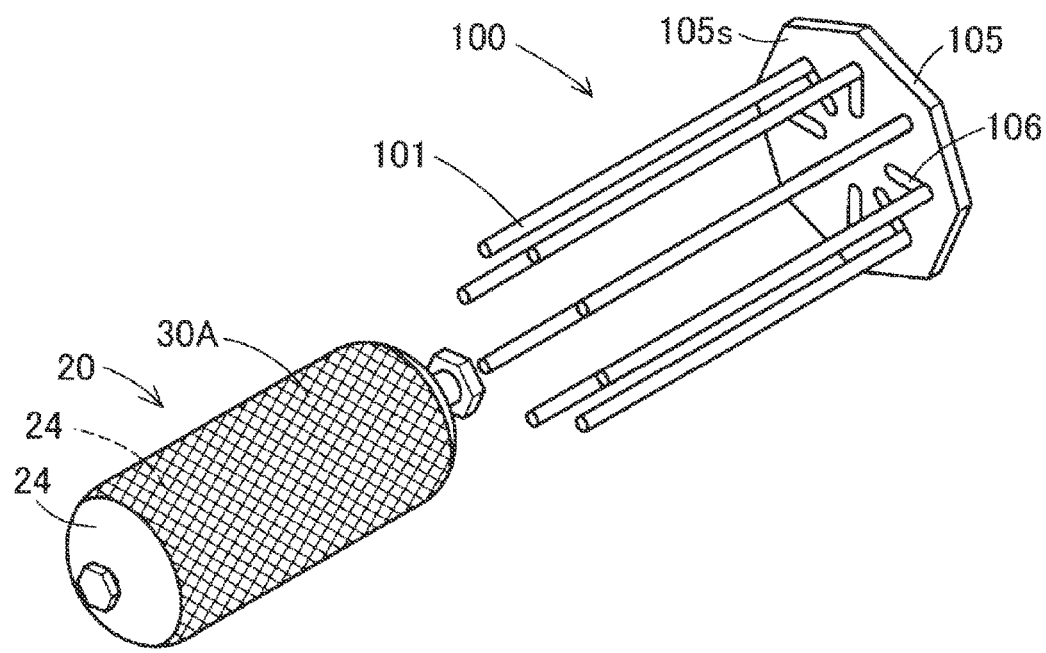
FIG. 8 is a schematic perspective view illustrating a state in which the attachment device completes attaching the tubular mesh member to the liner.

FIG. 8 is a schematic perspective view illustrating a state in which the attachment device 100 completes attaching the tubular mesh member 30A to the liner 20. After the liner 20 is inserted into the tubular mesh member 30A, the tubular mesh member 30A is fixed to the liner 20 by applying, between the shafts 101, an external force to the end of the tubular mesh member 30A opposite to the plate body 105 such that the tubular mesh member 30A is not separated from the fibers 24 of the liner 20. In this state, the liner 20 is moved away from the plate body 105 in a direction along the central axis CX to remove the shafts 101 from the space between the tubular mesh member 30A and the liner 20. Then, the tubular mesh member 30A contracts with its restoration force, and is fitted onto the fibers 24 wound around the liner 20. A groove for enhancing a slip of the tubular mesh member 30A may be provided in the side face of each shaft 101 such that the shaft 101 can smoothly be removed from the tubular mesh member 30A.

After the tubular mesh member 30A is attached to the liner 20, Step P4 of FIG. 3 is executed. Step P4 is a step of thermally curing the thermosetting resin 25. In Step P4, the liner 20 having the tubular mesh member 30A is placed in a heating furnace, and is heated to a temperature equal to or higher than a curing temperature of the thermosetting resin 25. Thus, the thermosetting resin impregnated in the fibers 24 is thermally cured. In Step P4, the liner 20 is heated while being rotated to reduce positional imbalance of the thermosetting resin 25 due to a flow of the molten thermosetting resin 25.

Figure 9:
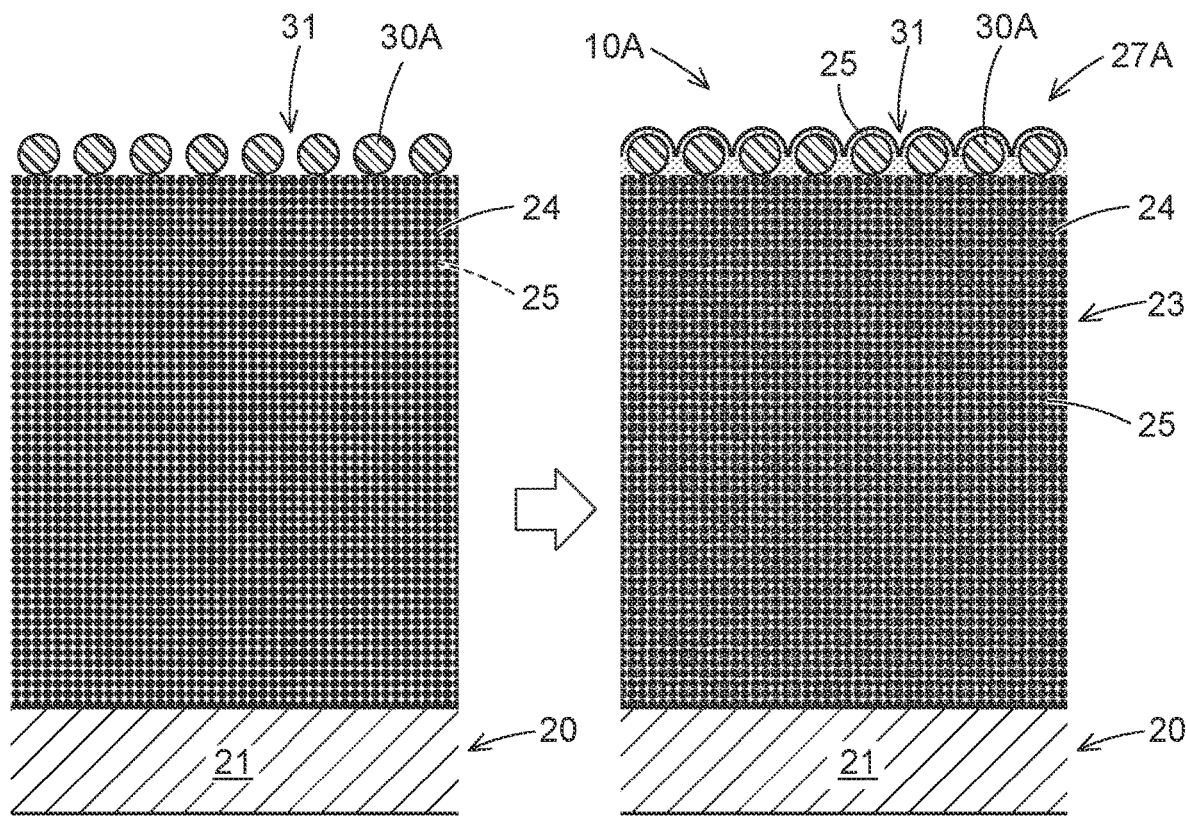
FIG. 9 is a schematic view illustrating states before and after a fiber layer and a protective layer are formed in a thermally curing step.

FIG. 9 is a schematic view illustrating states before and after the fiber layer 23 and the protective layer 27A are formed in the thermally curing step (Step P4). When the liner 20 having the fibers 24 and the tubular mesh member 30A is heated in the heating furnace in Step P4, the thermosetting resin 25 impregnated in the fibers 24 melts and flows to fill spaces between the fibers 24 and enter the pores 31 of the tubular mesh member 30A. The thermosetting resin 25 further flows to cover the entire tubular mesh member 30A. Then, the thermosetting resin 25 is thermally cured to form the fiber layer 23 and the protective layer 27A integrated by the thermosetting resin 25. In other words, the thermosetting resin impregnated in the fibers 24 and the thermosetting resin integrating the protective layer 27A are homogeneous.

According to the high-pressure tank 10A of the first embodiment described above, the tubular mesh member 30A is attached to the liner 20 before the thermally curing step. Therefore, the protective layer 27A that protects the fiber layer 23 can be formed easily. According to the high-pressure tank 10A of the first embodiment, the protective layer 27A of which strength is increased by coating the tubular mesh member 30A with the thermosetting resin 25 is formed on the superficial layer. Therefore, the durability of the high-pressure tank 10A is increased. According to the high-pressure tank 10A of the first embodiment, the thermosetting resin 25 enters the pores 31 of the tubular mesh member 30A such that the fiber layer 23 and the protective layer 27A are integrated. Therefore, deterioration of the high-pressure tank 10A due to peeling of the fiber layer 23 and the protective layer 27A is suppressed. With the protective layer 27A including the tubular mesh member 30A, it is easy to visually check whether any fiber of the mesh of the tubular mesh member 30A is broken. Therefore, the degree of deterioration of the protective layer 27A can visually be checked based on how the fibers of the tubular mesh member 30A are broken. Thus, it is possible to easily and appropriately determine a timing of replacement to be needed due to deterioration of the high-pressure tank 10A.

According to the high-pressure tank 10A of the first embodiment, the tubular mesh member 30A of the protective layer 27A has the stretching property. When the high-pressure tank 10A repeatedly expands and contracts because of repeated charging and discharging of the storage fluid, the tubular mesh member 30A can stretch and contract to follow the expansion and contraction. This stretching property suppresses deterioration of the protective layer 27A due to the repeated expansion and contraction of the high-pressure tank 10A. The stretchable tubular mesh member 30A suppresses confinement of the expansion of the high-pressure tank 10A by the protective layer 27A. Therefore, generation of internal stress is suppressed when the high-pressure tank 10A expands, and thus deterioration of the high-pressure tank 10A is suppressed. In the first embodiment, the tubular mesh member 30A is contractible with the restoration force generated when the tubular mesh member 30A is stretched. Therefore, the followability of the protective layer 27A when the high-pressure tank 10A contracts is increased. In addition, the tubular mesh member 30A having the stretching property can easily be attached to the liner 20. Therefore, the protective layer 27A can be formed in a shorter time. By attaching the tubular mesh member 30A to the liner 20 in a state in which the restoration force is generated, the tubular mesh member 30A can be fitted to irregularities of the wound layers of the fibers 24 formed on the superficial layer of the liner 20. Therefore, creasing of the tubular mesh member 30A is suppressed, and generation of a gap between the tubular mesh member 30A and the fiber 24 is suppressed. Thus, it is possible to suppress deterioration of the appearance of the high-pressure tank 10A due to the creasing of the tubular mesh member 30A, and to suppress a decrease in the durability of the protective layer 27A due to the gap generated between the tubular mesh member 30A and the fiber 24.

Second Embodiment

Figure 10A:
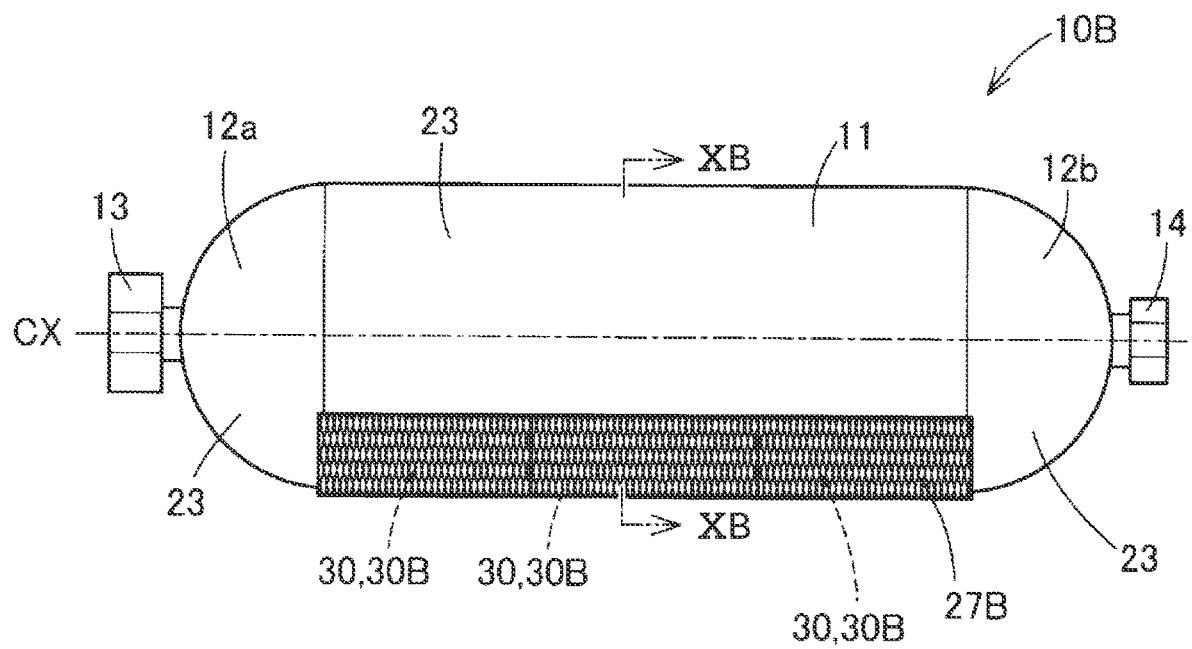
FIG. 10A is a schematic side view illustrating a high-pressure tank of a second embodiment.
Figure 10B:
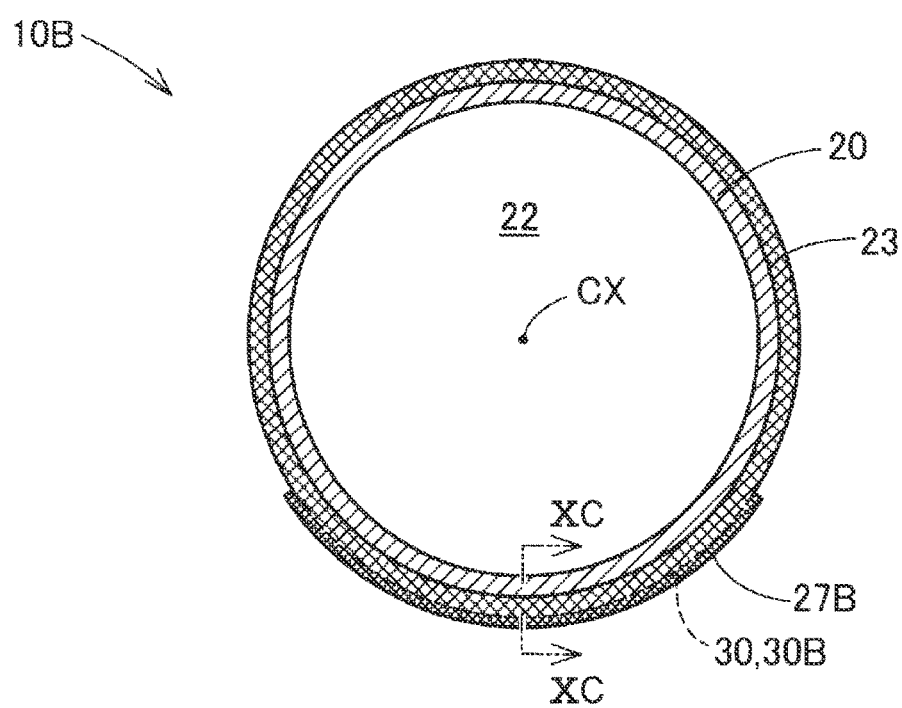
FIG. 10B is a schematic sectional view of the high-pressure tank of the second embodiment.
Figure 10C:
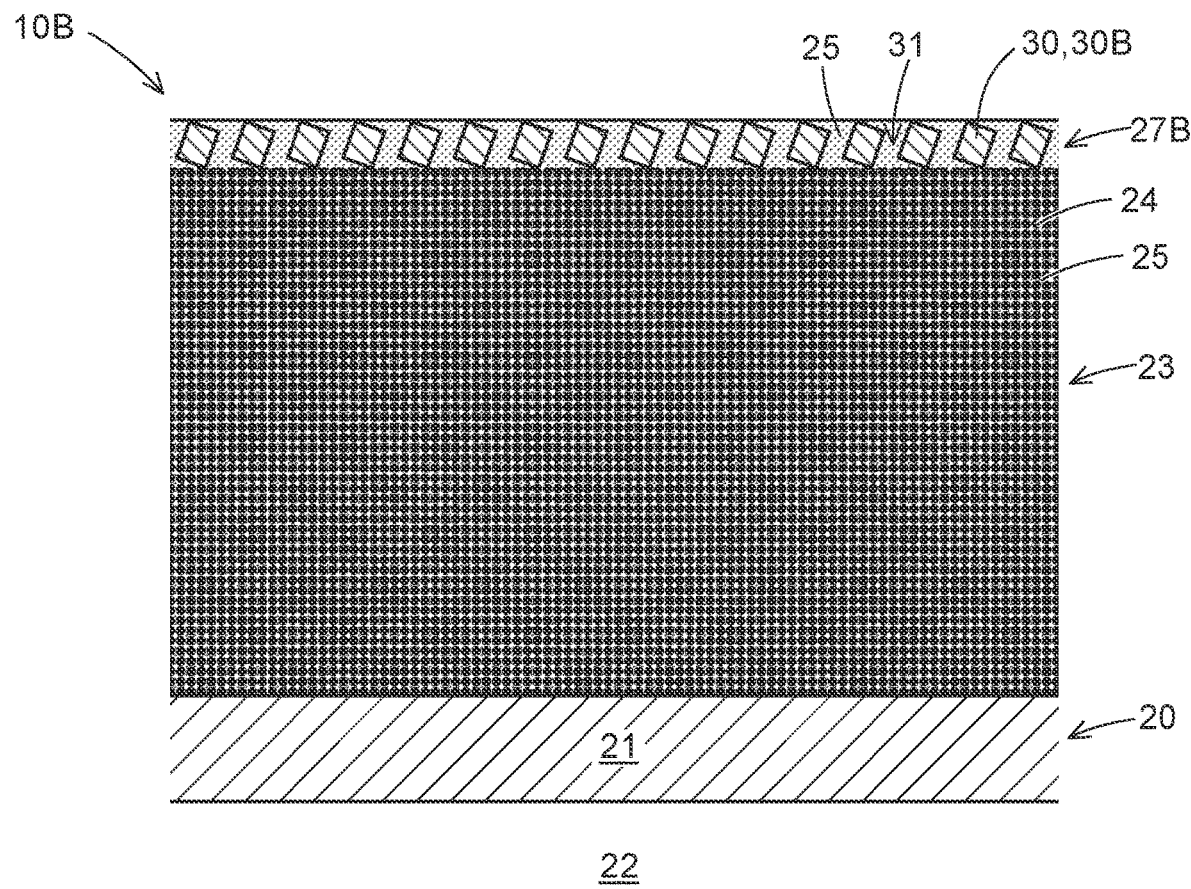
FIG. 10C is a schematic sectional view of the high-pressure tank of the second embodiment.

FIG. 10A is a schematic side view illustrating a high-pressure tank 10B of a second embodiment. FIG. 10B is a schematic sectional view of the high-pressure tank 10B cut along a line XB-XB in FIG. 10A. FIG. 10C is a schematic sectional view of the high-pressure tank 10B cut along a line XC-XC in FIG. 10B. The structure of the high-pressure tank 10B of the second embodiment is substantially the same as that of the high-pressure tank 10A of the first embodiment except that a protective layer 27B of the second embodiment is provided in place of the protective layer 27A described in the first embodiment.

As illustrated in FIG. 10A and FIG. 10B, the protective layer 27B of the second embodiment covers a part of the side face of the cylinder 11 in a range between the domes 12a and 12b at respective ends. The high-pressure tank 10B is mounted on the fuel cell vehicle in a posture in which the protective layer 27B is located on a lower side. As illustrated in FIG. 10B, the protective layer 27B of the second embodiment covers the cylinder 11 in its circumferential direction in a range of about ⅓ to ½ of the perimeter of the cylinder 11. As illustrated in FIG. 10C, the protective layer 27B includes the porous member 30 having the pores 31 extending through the porous member 30 in its thickness direction. The pores 31 are arrayed over the entire part of the porous member 30. In the second embodiment, the porous member 30 is formed of sheet mesh members 30B described below. The sheet mesh members 30B are arranged over the entire protective layer 27B.

Figure 11:
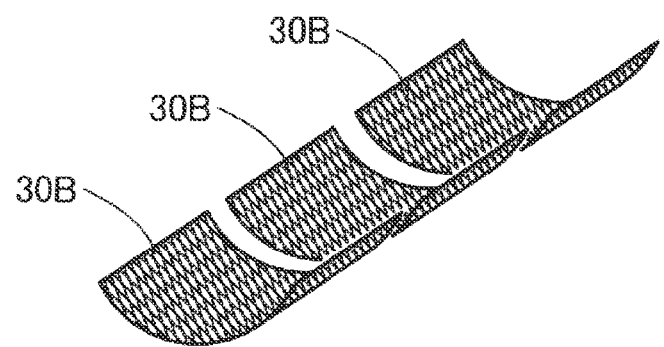
FIG. 11 is a schematic perspective view illustrating sheet mesh members of the second embodiment.
Figure 12:
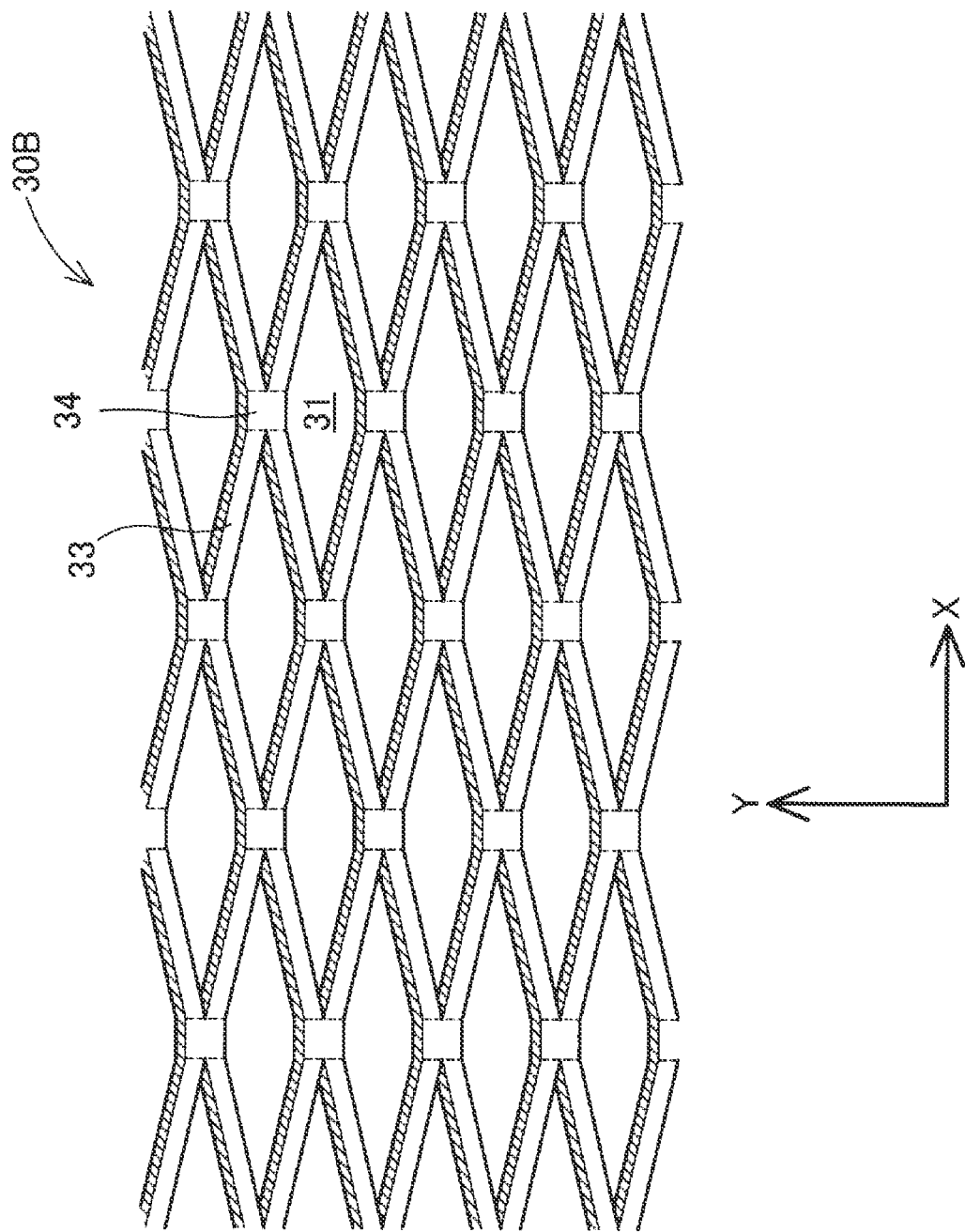
FIG. 12 is a schematic perspective view illustrating a part of the sheet mesh member of the second embodiment on a larger scale.

The structure of each sheet mesh member 30B of the protective layer 27B is described also with reference to FIG. 11 and FIG. 12. FIG. 11 is a schematic perspective view illustrating the sheet mesh members 30B. FIG. 12 is a schematic perspective view illustrating a part of the sheet mesh member 30B on a larger scale.

Reference is made to FIG. 11. In the second embodiment, the protective layer 27B includes a plurality of metal sheet mesh members 30B as the porous member 30. Each sheet mesh member 30B has a curved shape conforming to the side face of the cylinder 11, and a mesh that defines the pores 31 is formed over the entire sheet mesh member 30B. The sheet mesh member 30B has a shape keeping property for keeping the curved sheet shape. As illustrated in FIG. 10A, the sheet mesh members 30B are arrayed in line on the side face of the cylinder 11 along a central axis CX of the high-pressure tank 10B. The reason why the protective layer 27B is formed by using the plurality of sheet mesh members 30B is described later.

Reference is made to FIG. 12. In the second embodiment, the sheet mesh member 30B is stretchable or contractible by deformation of the mesh. For example, the sheet mesh member 30B is made of an expanded metal. The pores 31 of the sheet mesh member 30B are formed such that a plurality of small slits arrayed in a staggered pattern in a metal sheet serving as a base of the sheet mesh member 30B is opened by pushing out both side portions of each slit to opposite sides along a thickness direction of the metal sheet. In FIG. 12, surfaces that are previously the inner wall surfaces of the slits are hatched. In the second embodiment, each pore 31 is open in a rhomboid shape as illustrated in FIG. 12.

The sheet mesh member 30B includes a plurality of threads 33 and a plurality of couplers 34 each coupling the ends of four threads 33. In the second embodiment, the threads 33 are straight portions having the same length to serve as four sides of each rhomboid pore 31. The couplers 34 serve as corners of each rhomboid pore 31.

The sheet mesh member 30B is stretched or contracted by changing the dimensional ratios of the rhomboid pores 31 in a width direction X and a length direction Y. The "width direction X" is a circumferential direction of the high-pressure tank 10B when the sheet mesh member 30B is arranged on the high-pressure tank 10B. The "length direction Y" is a direction along the central axis CX of the high-pressure tank 10B.

When the sheet mesh member 30B is stretched in the width direction X, the opening widths of the pores 31 in the width direction X increase, and the opening widths of the pores 31 in the length direction Y decrease. When the sheet mesh member 30B is contracted in the width direction X, the opening widths of the pores 31 in the width direction X decrease, and the opening widths of the pores 31 in the length direction Y increase. Since the sheet mesh member 30B has the stretching property, the protective layer 27B can stretch and contract to follow expansion and contraction of the high-pressure tank 10B.

In the second embodiment, the plurality of sheet mesh members 30B is arrayed in the direction along the central axis CX of the high-pressure tank 10B as described above. Thus, the dimension of each sheet mesh member 30B in the length direction Y along the central axis CX of the high-pressure tank 10B can be reduced. With the small dimension of each sheet mesh member 30B in the length direction Y, the sheet mesh member 30B can easily contract in the length direction Y when the high-pressure tank 10B expands and the sheet mesh member 30B stretches in the width direction X. Thus, it is possible to reduce stress in the protective layer 27B when the high-pressure tank 10B expands, thereby suppressing deterioration of the protective layer 27B due to repeated expansion and contraction of the high-pressure tank 10B.

Figure 13:
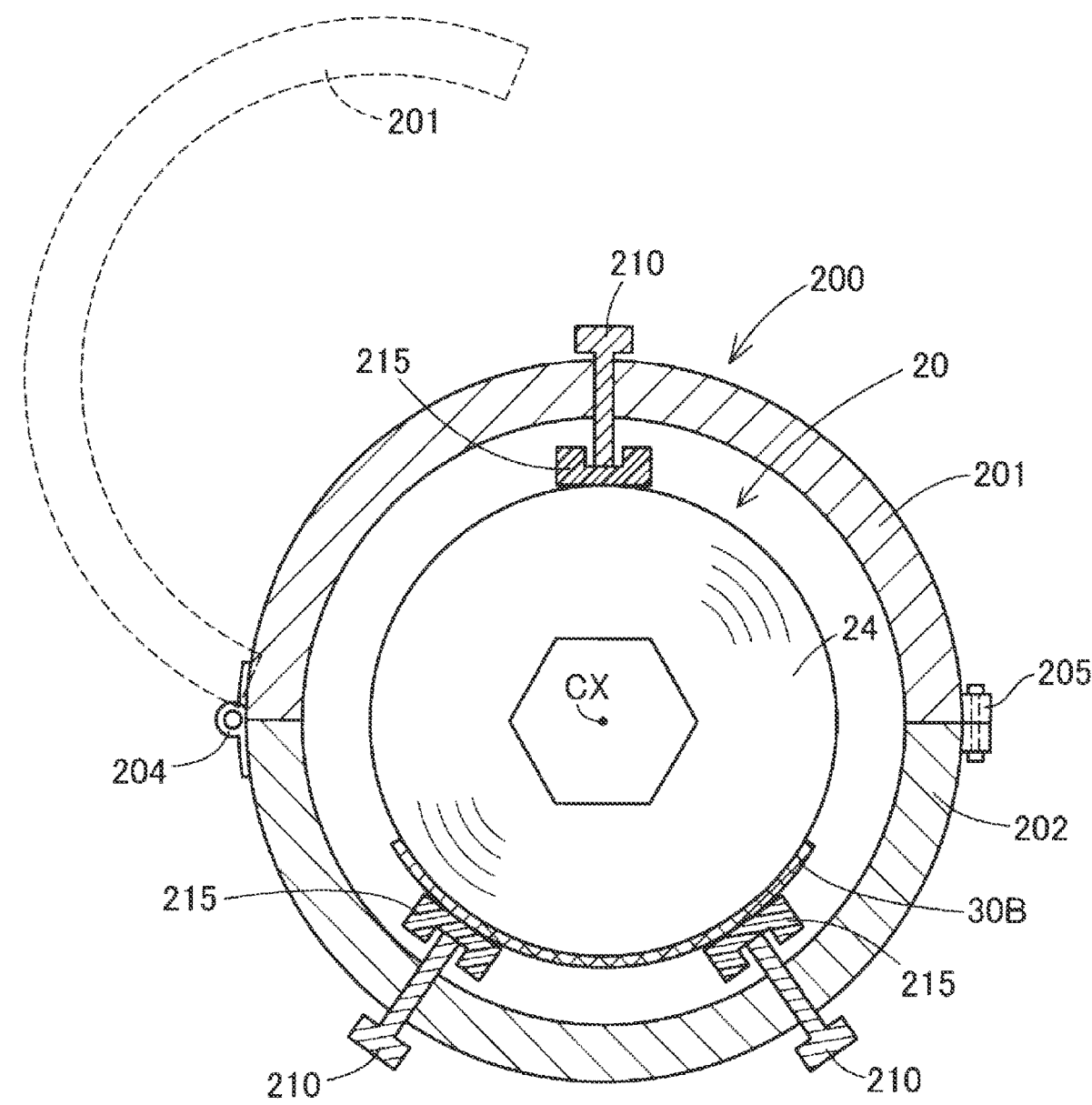
FIG. 13 is a schematic sectional view illustrating a retaining member for use in a thermally curing step of the second embodiment.

The structure of a retaining member 200 for use in a thermally curing step in a process for manufacturing the high-pressure tank 10B of the second embodiment is described with reference to FIG. 13. FIG. 13 is a schematic sectional view in a cutting plane orthogonal to a central axis of the retaining member 200 that retains the liner 20 of the high-pressure tank 10B.

The high-pressure tank 10B of the second embodiment is manufactured through the flow of the manufacturing process of FIG. 3 similarly to the high-pressure tank 10A described in the first embodiment. In Step P3 of the second embodiment, the sheet mesh members 30B serving as the porous member 30 are arranged on the fibers 24 wound around the liner 20. In the thermally curing step (Step P4), the thermosetting resin 25 enters the pores 31 of the sheet mesh member 30B and is thermally cured to form the protective layer 27B. In the thermally curing step, the retaining member 200 is used for suppressing detachment of the sheet mesh members 30B from the liner 20 before the thermosetting resin 25 is thermally cured. The retaining member 200 retains the liner 20 and the sheet mesh members 30B in close contact with each other. The liner 20 and the sheet mesh members 30B are heated while being rotated together with the retaining member 200 in a heating furnace in the state in which the liner 20 and the sheet mesh members 30B are retained by the retaining member 200.

The retaining member 200 has a cylindrical shape. The liner 20 having the sheet mesh member 30B is housed in the retaining member 200. The retaining member 200 includes a semi-cylindrical first side wall 201 and a semi-cylindrical second side wall 202 that face each other across the central axis of the retaining member 200. A circumferential end of the first side wall 201 is coupled to a circumferential end of the second side wall 202 via a hinge 204. The first side wall 201 turns about the hinge 204 relative to the second side wall 202.

As indicated by a dashed line in FIG. 13, the first side wall 201 is turned relative to the second side wall 202 to open the retaining member 200. Therefore, the liner 20 having the sheet mesh member 30B can be housed in the retaining member 200. The liner 20 is arranged in the retaining member 200 such that the sheet mesh member 30B faces the inner peripheral surface of the second side wall 202.

A lock mechanism 205 is provided at circumferential ends of the first side wall 201 and the second side wall 202 opposite to the hinge 204. The lock mechanism 205 couples the first side wall 201 and the second side wall 202 in a state in which the first side wall 201 and the second side wall 202 are closed, thereby restricting the turn of the first side wall 201 and the second side wall 202. After the liner 20 is housed in the retaining member 200, the first side wall 201 and the second side wall 202 are fixed by the lock mechanism 205.

A plurality of support members 210 is attached to the retaining member 200 to support the sheet mesh members 30B and the liner 20 in the retaining member 200. Each support member 210 is a bolt passing through the first side wall 201 or the second side wall 202. The plurality of support members 210 of each side wall 201 or 202 is arrayed in a direction along the central axis of the retaining member 200 though illustration is omitted because the support members 210 overlap each other in FIG. 13. The support members 210 passing through the first side wall 201 press, at their distal ends, the fibers 24 wound around the side face of the liner 20. The support members 210 passing through the second side wall 202 press, at their distal ends, both ends of each sheet mesh member 30B in the circumferential direction of the liner 20. A position of the central axis CX of the liner 20 can be adjusted by adjusting insertion depths of the support members 210. Thus, it is possible to suppress unevenness of the heating temperature that may be caused by misalignment of the central axis CX of the liner 20 from the central axis of the retaining member 200.

A cushioning member 215 is arranged between each support member 210 and the sheet mesh member 30B or the fiber 24 wound around the liner 20. The cushioning member 215 is made of a thermosetting resin 25 of the same type as that of the thermosetting resin 25 impregnated in the fibers 24. In the thermally curing step, the cushioning member 215 is melted and thermally cured while being integrated with the thermosetting resin 25 of the fiber layer 23 or the protective layer 27B. After the thermally curing step, a mass of the thermally cured cushioning member 215 remaining on the superficial layer of the high-pressure tank 10B is removed by grinding or the like. This operation reduces the occurrence of a case where a mark of support by the support member 210 of the retaining member 200 remains on the superficial layer of the high-pressure tank 10B.

According to the high-pressure tank 10B of the second embodiment described above, the protective layer 27B includes the sheet mesh members 30B that keep their shapes as sheet shapes. Therefore, the strength of the protective layer 27B is increased. The sheet mesh member 30B of the protective layer 27B stretches or contracts by deformation of the mesh. Therefore, the protective layer 27B can follow the expansion and contraction of the high-pressure tank 10B. Thus, the durability of the protective layer 27B is increased. In addition, the sheet mesh member 30B is arranged in a desired region to form the protective layer 27B that covers only this region. Therefore, the protective layer 27B can easily be formed only in a region having great need for protection. Thus, it is possible to suppress an increase in the weight of the high-pressure tank 10B or an increase in manufacturing costs due to formation of the protective layer 27B in a region having less need for protection. According to the high-pressure tank 10B of the second embodiment and its manufacturing method, various actions and effects similar to those described in the first embodiment can be attained.

Third Embodiment

Figure 14:
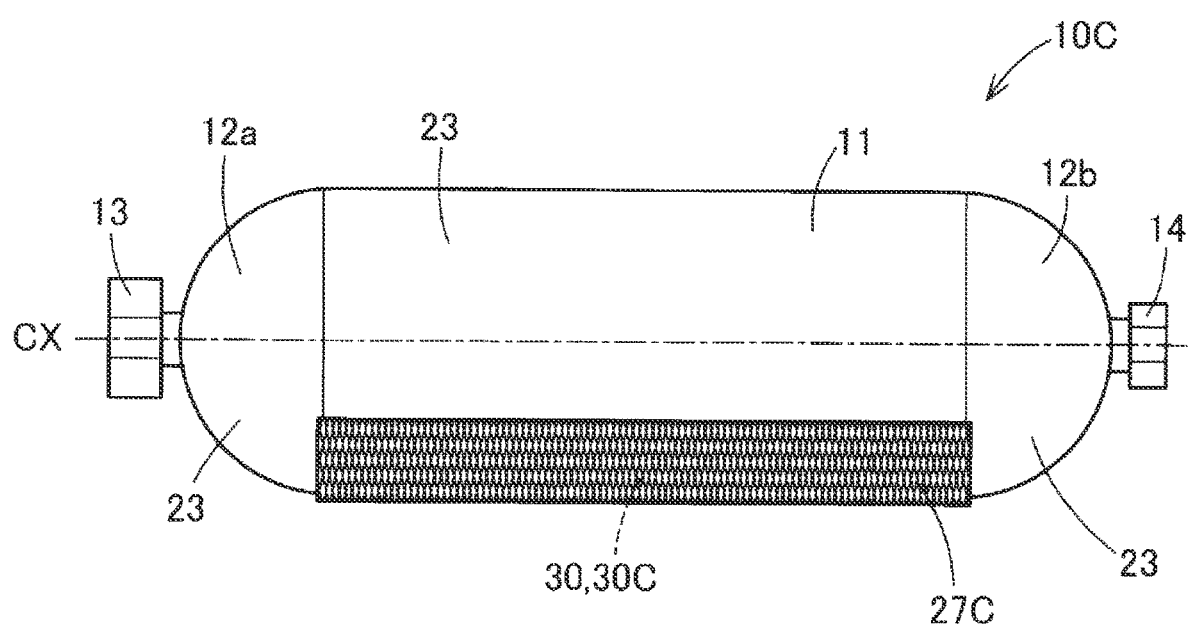
FIG. 14 is a schematic side view illustrating a high-pressure tank of a third embodiment.

FIG. 14 is a schematic side view illustrating a high-pressure tank 10C of a third embodiment. The structure of the high-pressure tank 10C of the third embodiment is substantially the same as the structure of the high-pressure tank 10B of the second embodiment except that a sheet mesh member 30C of the third embodiment described below is used in place of the sheet mesh members 30B described in the second embodiment. A protective layer 27C of the third embodiment is formed by the thermosetting resin 25 entering the pores 31 of a single sheet mesh member 30C.

Figure 15:
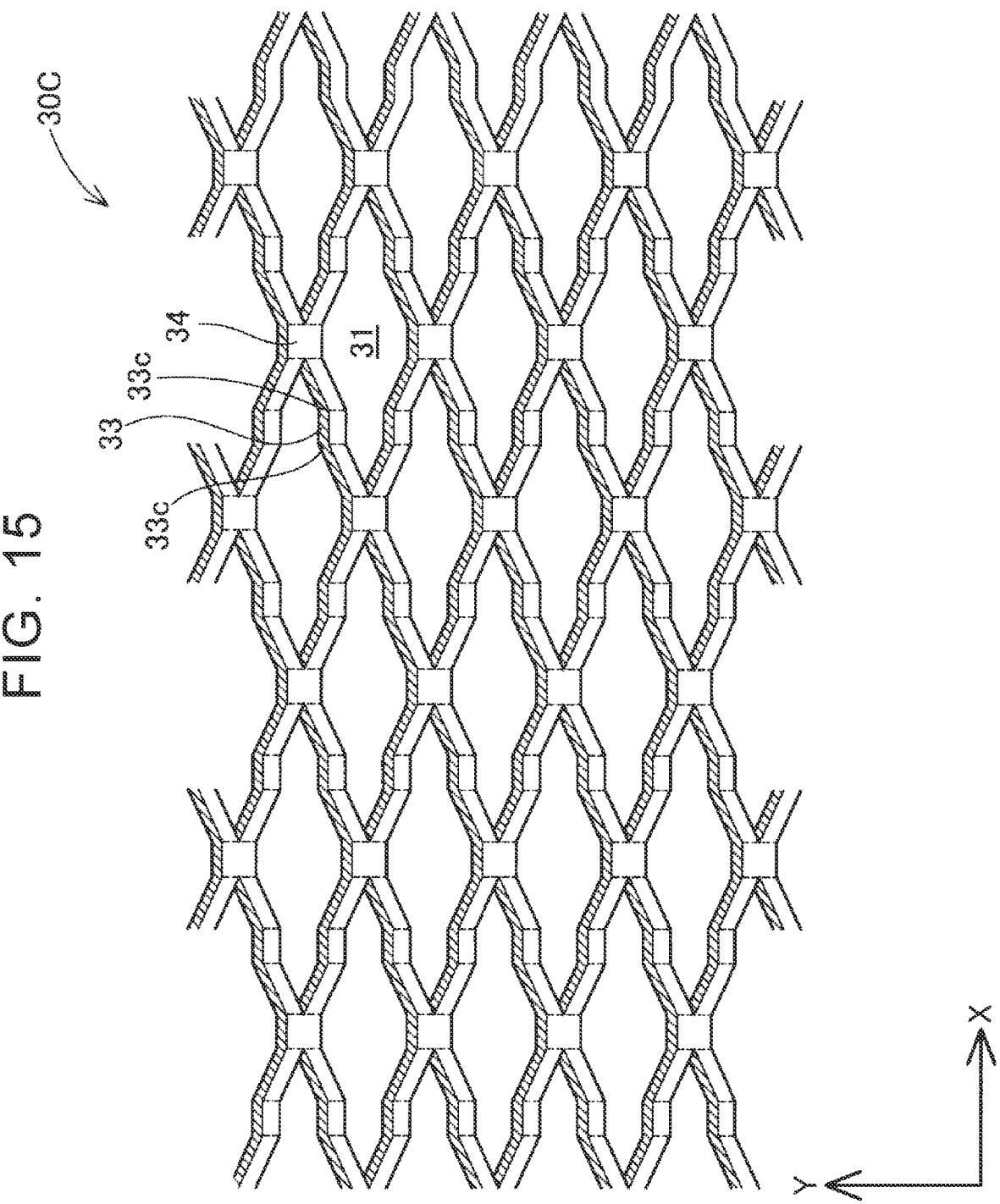
FIG. 15 is a schematic perspective view illustrating the structure of a sheet mesh member of the third embodiment.

FIG. 15 is a schematic perspective view illustrating the structure of the sheet mesh member 30C. The sheet mesh member 30C of the third embodiment is made of an expanded metal similarly to the sheet mesh member 30B of the second embodiment, but differs from the sheet mesh member 30B of the second embodiment in terms of the opening shapes of the pores 31. In the sheet mesh member 30C, each of the threads 33 enclosing the pore 31 has two bent portions 33c. Therefore, the thread 33 is bent into a crank shape. In the sheet mesh member 30C, each thread 33 can be bent at the two bent portions 33c as joints in addition to the coupler 34. In the sheet mesh member 30C, the opening shape of each pore 31 can be changed more freely. Therefore, the sheet mesh member 30C can stretch and contract in the width direction X and the length direction Y independently. With the sheet mesh member 30C, the followability of the protective layer 27C for expansion and contraction of the high-pressure tank 10C can be increased.

Figure 16:
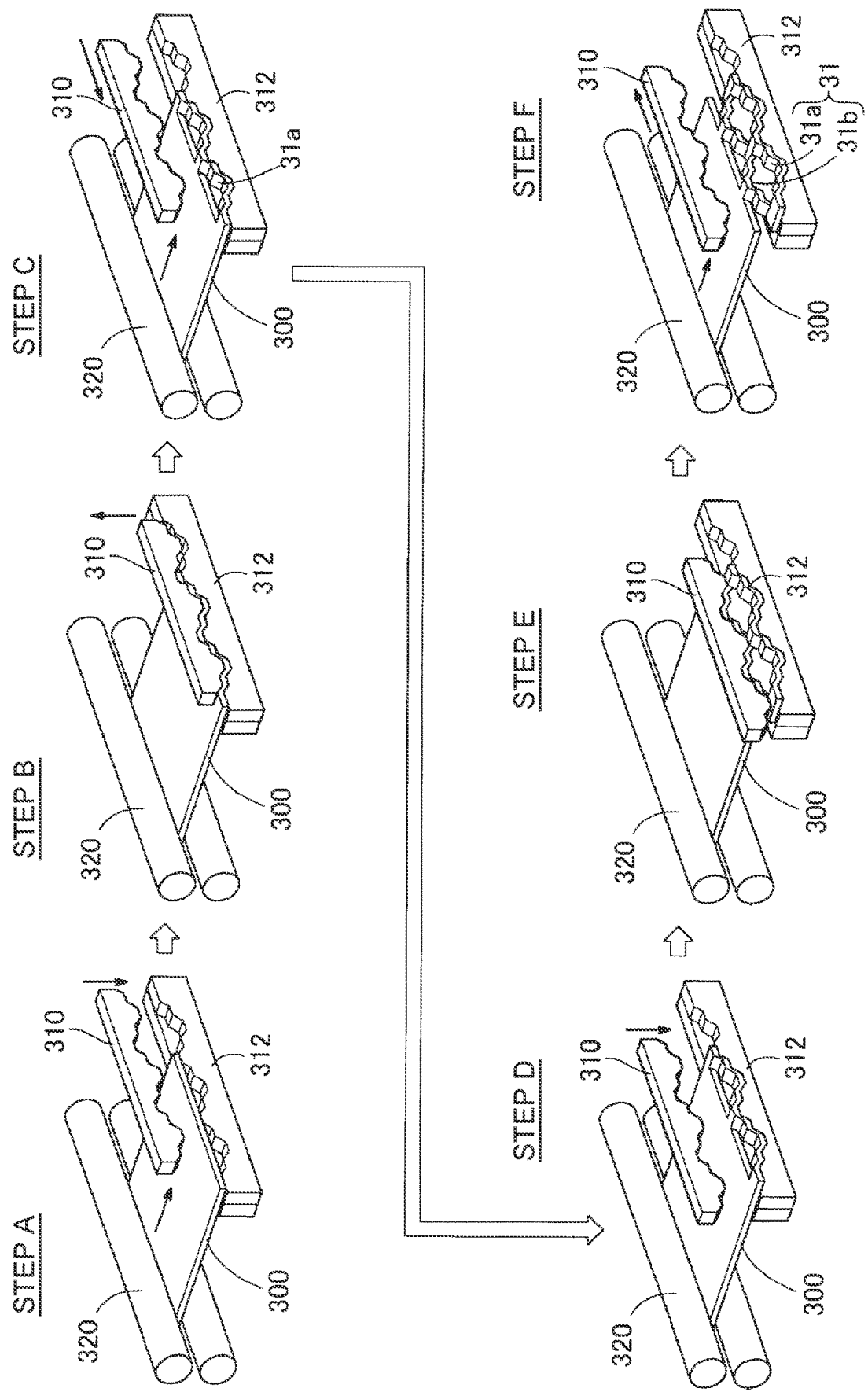
FIG. 16 is a schematic view illustrating a process for manufacturing the sheet mesh member of the third embodiment.

FIG. 16 is a schematic view illustrating a process for manufacturing the sheet mesh member 30C. In Steps A, B, and C at an upper part of the drawing sheet of FIG. 16, a metal sheet 300 supported by conveyance rollers 320 is pressed once by an upper die 310 and a lower die 312 each having a thin plate shape conforming to the shapes of the threads 33. Thus, regions 31a each corresponding to a half of the pore 31 are formed in the metal sheet 300. After the first press, the metal sheet 300 is conveyed by the conveyance rollers 320 by a distance corresponding to the thicknesses of the upper die 310 and the lower die 312. Further, the positions of the upper die 310 and the lower die 312 are shifted in a direction orthogonal to the conveyance direction of the metal sheet 300 by a distance corresponding to a half of the dimension of the pore 31 in the width direction X. In Steps D, E, and F at a lower part of the drawing sheet of FIG. 16, regions 31b each corresponding to the remaining half of the pore 31 are formed by a second press using the upper die 310 and the lower die 312. The sheet mesh member 30C is easily formed by repeating Steps A to F. The sheet mesh member 30C of the third embodiment can be manufactured by using the same manufacturing device as that for the sheet mesh member 30B of the second embodiment through replacement of only the upper die 310 and the lower die 312.

According to the third embodiment described above, the followability of the protective layer 27C for the expansion and contraction of the high-pressure tank 10C is increased by the sheet mesh member 30C to be deformed to stretch and contract in the width direction X and the length direction Y more freely than the sheet mesh member 30B of the second embodiment. According to the high-pressure tank 10C of the third embodiment and its manufacturing method, various actions and effects described in the embodiments above can be attained.

Fourth Embodiment

Figure 17:
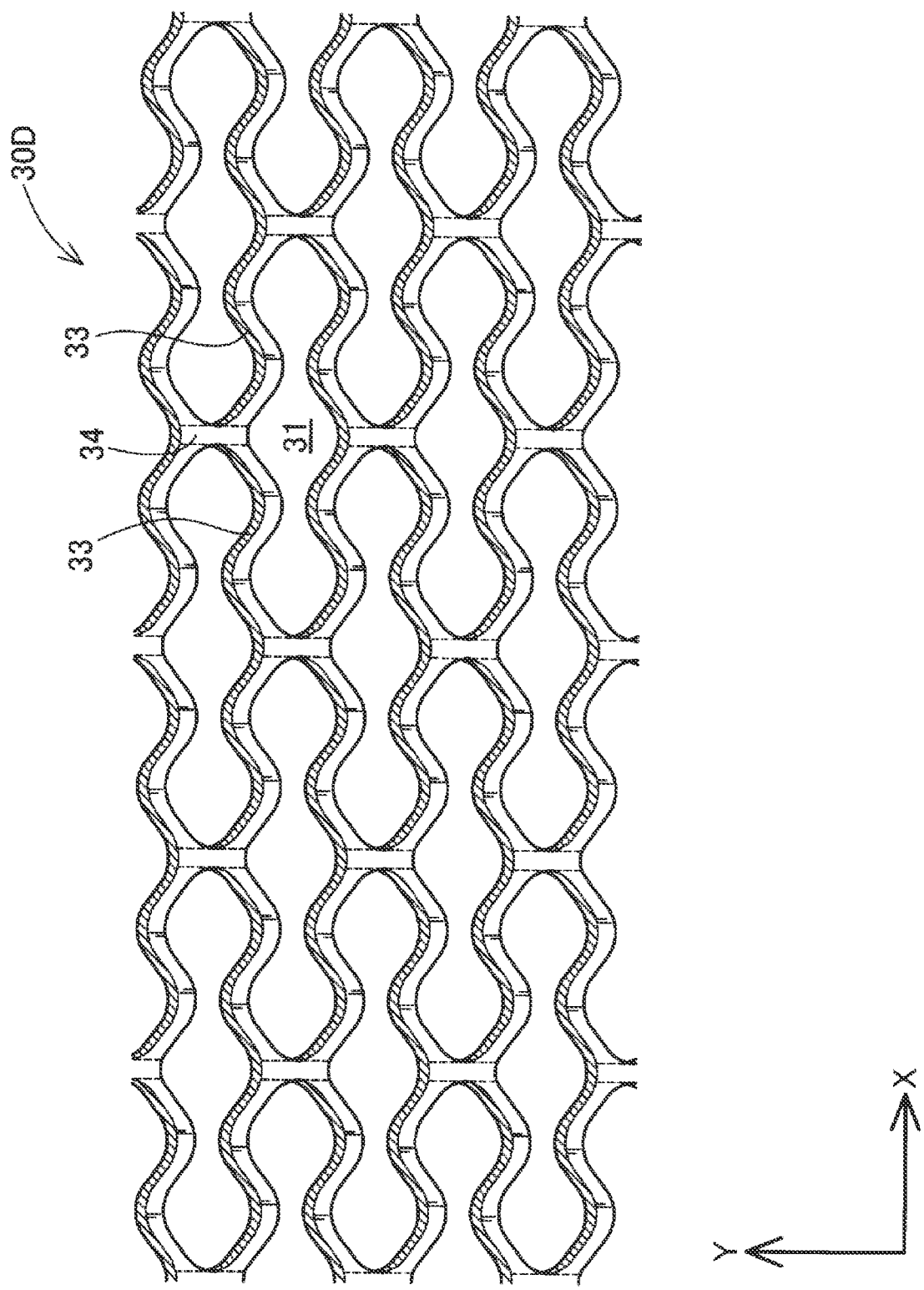
FIG. 17 is a schematic perspective view illustrating the structure of a sheet mesh member of a fourth embodiment.

FIG. 17 is a schematic perspective view illustrating the structure of a sheet mesh member 30D to be used as the porous member 30 in a high-pressure tank of a fourth embodiment. The structure of the high-pressure tank of the fourth embodiment is substantially the same as the structure of the high-pressure tank 10C of the third embodiment except that the sheet mesh member 30D of the fourth embodiment is used in place of the sheet mesh member 30C described in the third embodiment. The sheet mesh member 30D of the fourth embodiment is substantially the same as the sheet mesh member 30C of the third embodiment except that the opening shapes of the pores 31 differ as described below.

The structure of the sheet mesh member 30D of the fourth embodiment corresponds to a structure in which the bent portions 33c of each thread 33 described in the third embodiment are changed to curved portions. Each thread 33 has a shape of a trigonometric waveform. The opening shape of each pore 31 of the sheet mesh member 30D corresponds to a shape in which the ends of three ellipses arrayed in line in a major diameter direction are coupled together.

According to the sheet mesh member 30D of the fourth embodiment, stress in each thread 33 is distributed when the sheet mesh member 30D is stretched or contracted by changing the opening shape of the pore 31. Therefore, stress concentration is suppressed when the sheet mesh member 30D is stretched or contracted. According to the sheet mesh member 30D of the fourth embodiment, the durability of the protective layer of the high-pressure tank can further be increased. The sheet mesh member 30D of the fourth embodiment can easily be manufactured similarly to the sheet mesh member 30C of the third embodiment by changing only the shapes of the upper die 310 and the lower die 312 illustrated in FIG. 16. According to the high-pressure tank of the fourth embodiment and its manufacturing method, various actions and effects described in the embodiments above can be attained.

Fifth Embodiment

Figure 18:
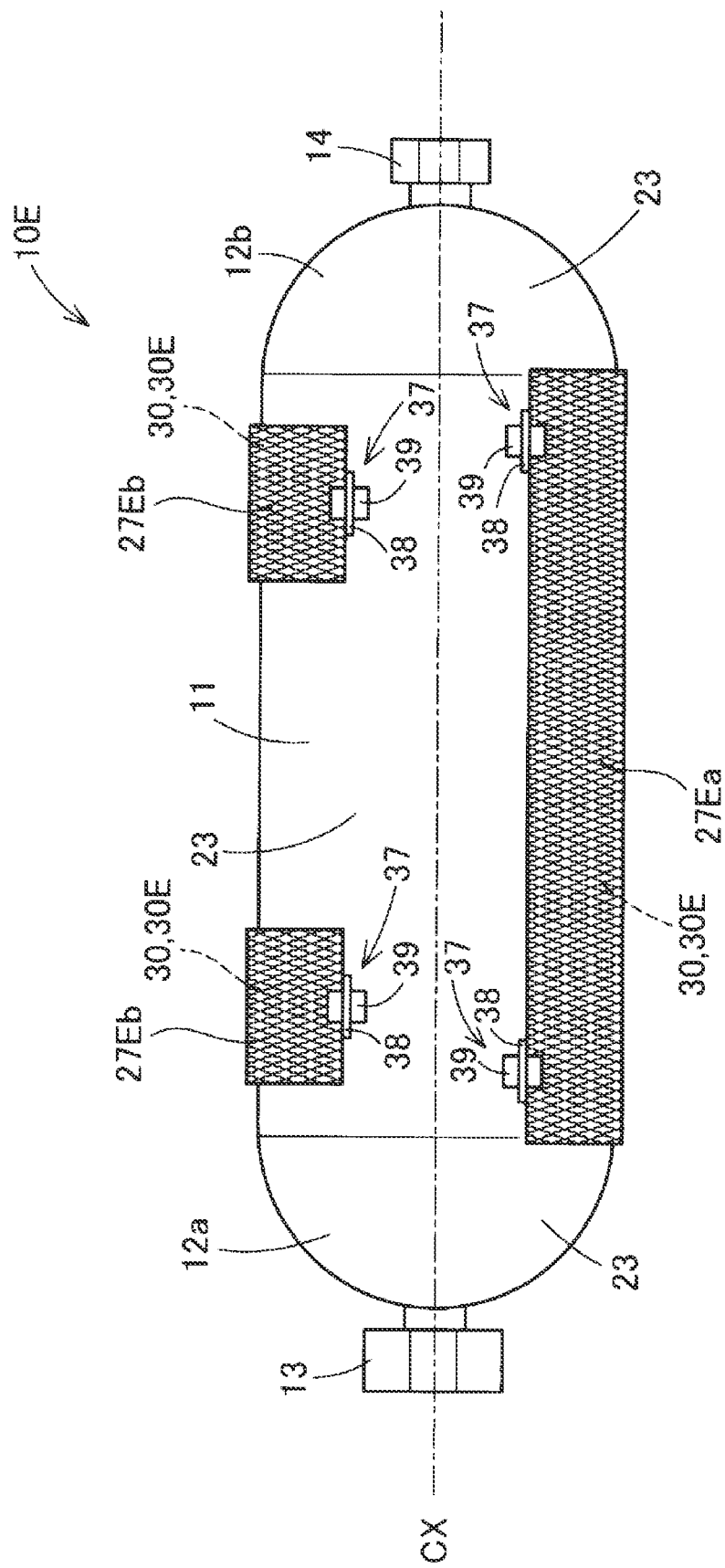
FIG. 18 is a schematic side view illustrating a high-pressure tank of a fifth embodiment.
Figure 19:
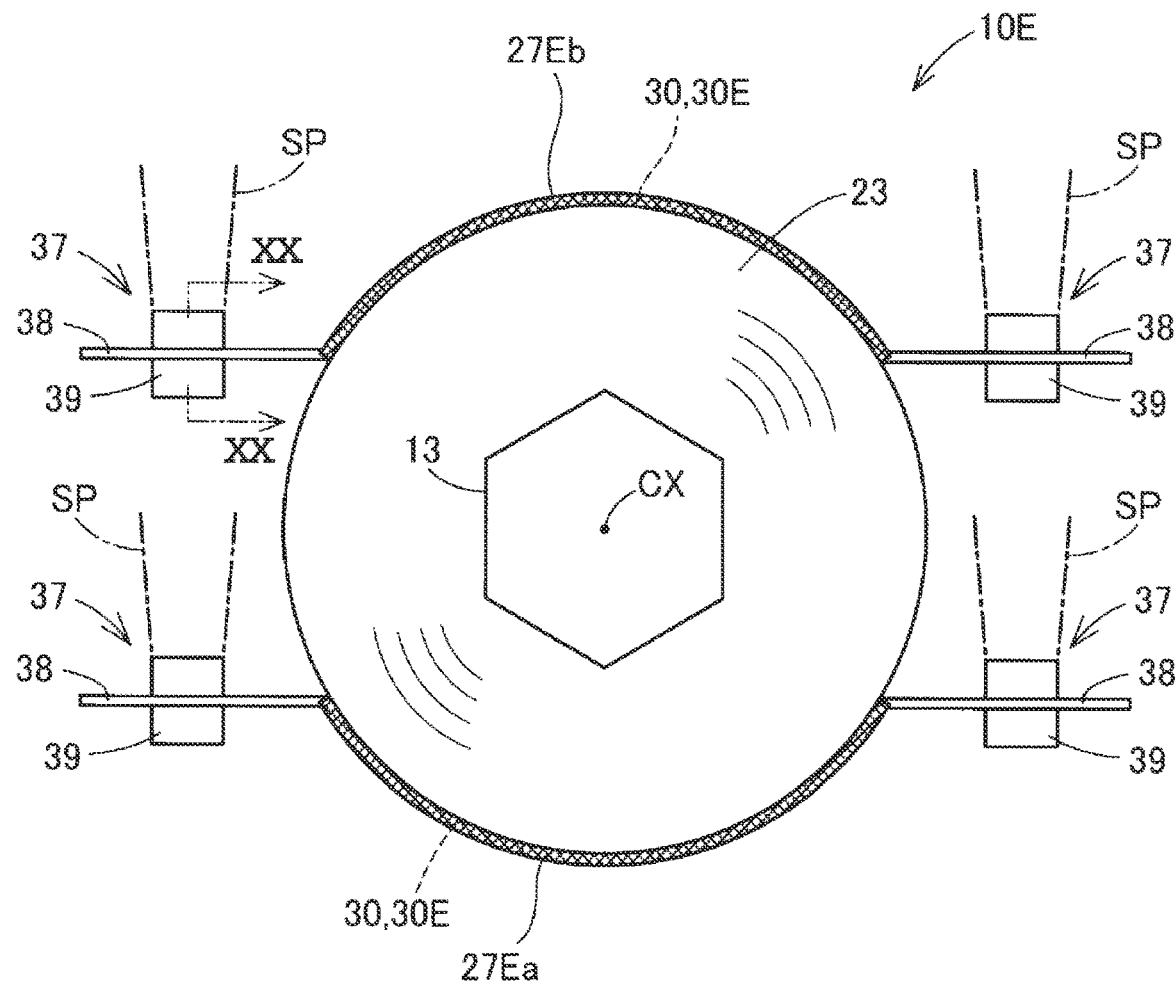
FIG. 19 is a schematic view illustrating the high-pressure tank of the fifth embodiment.

FIG. 18 is a schematic side view illustrating a high-pressure tank 10E of a fifth embodiment. FIG. 19 is a schematic view of the high-pressure tank 10E of the fifth embodiment that is viewed from a direction along the central axis CX. The structure of the high-pressure tank 10E of the fifth embodiment is substantially the same as the structure of the high-pressure tank 10C of the third embodiment except for the following features.

As illustrated in FIG. 18, the high-pressure tank 10E of the fifth embodiment is provided with a first protective layer 27Ea and second protective layers 27Eb in place of the protective layer 27C described in the third embodiment. The first protective layer 27Ea and each second protective layer 27Eb are arranged away from each other on the cylinder 11 at positions where the first protective layer 27Ea and the second protective layer 27Eb face each other across the central axis CX.

As illustrated in FIG. 18 and FIG. 19, the first protective layer 27Ea covers a part of the circumferential region of the cylinder 11 over the range between the two domes 12a and 12b similarly to the protective layer 27C described in the third embodiment. The first protective layer 27Ea covers the cylinder 11 in its circumferential direction in a range of about ⅓ to ½ of the perimeter of the cylinder 11.

As illustrated in FIG. 18, the high-pressure tank 10E is provided with a plurality of second protective layers 27Eb. The second protective layers 27Eb are arrayed away from each other in the direction along the central axis CX. The second protective layers 27Eb include a second protective layer provided closer to the first dome 12a than the second dome 12b, and a second protective layer provided closer to the second dome 12b than the first dome 12a. The two second protective layers 27Eb are provided at symmetrical positions across the center of gravity of the high-pressure tank 10E. As illustrated in FIG. 19, each of the second protective layers 27Eb covers the cylinder 11 in its circumferential direction in a range of about ⅓ to ½ of the perimeter of the cylinder 11. In other embodiments, one or more second protective layers 27Eb may further be provided between the two second protective layers 27Eb provided close to the domes 12a and 12b. In other embodiments, a single second protective layer 27Eb may be provided.

Reference is made to FIG. 18 and FIG. 19. Each of the protective layers 27Ea and 27Eb includes a sheet mesh member 30E. The structure of the sheet mesh member 30E is substantially the same as the structure of the sheet mesh member 30C of the third embodiment illustrated in FIG. 15 except that fasteners 37 described below are added to both ends. The high-pressure tank 10E is manufactured by arranging the sheet mesh members 30E provided with the fasteners 37 on the fibers 24 of the liner 20 on which the fibers 24 are wound and causing the thermosetting resin 25 to enter the pores 31 of the sheet mesh members 30E and thermally curing the thermosetting resin 25 in the thermally curing step. In other embodiments, the sheet mesh member 30E may have a structure in which the fasteners 37 are added to the sheet mesh member 30B of the second embodiment illustrated in FIG. 12, the sheet mesh member 30C of the third embodiment illustrated in FIG. 15, or the sheet mesh member 30D of the fourth embodiment illustrated in FIG. 17.

The sheet mesh member 30E of each of the protective layers 27Ea and 27Eb has the fasteners 37 at respective ends in the circumferential direction of the cylinder 11. Each fastener 37 includes a plate portion 38 and a mount member 39. The plate portion 38 is coupled to the end of the sheet mesh member 30E, and extends outward from the surface of the high-pressure tank 10E. The mount member 39 is made of rubber, and is attached to the plate portion 38. Supports SP are coupled to the fasteners 37 to support the high-pressure tank 10E provided in the fuel cell vehicle. The supports SP extend, on both sides of the high-pressure tank 10E, from the second protective layer 27Eb side to the first protective layer 27Ea side, and are coupled to the corresponding fasteners 37.

Reference is made to FIG. 18. The first protective layer 27Ea is provided with the fasteners 37 at positions close to both ends in the direction along the central axis CX. The fasteners 37 are desirably provided at symmetrical positions across the center of gravity of the high-pressure tank 10E. Each second protective layer 27Eb is provided with the fastener 37 at the center in the direction along the central axis CX. The fastener 37 of the first protective layer 27Ea and the fastener 37 of the second protective layer 27Eb are offset in the direction along the central axis CX to avoid interference between the supports SP illustrated in FIG. 19.

Figure 20:
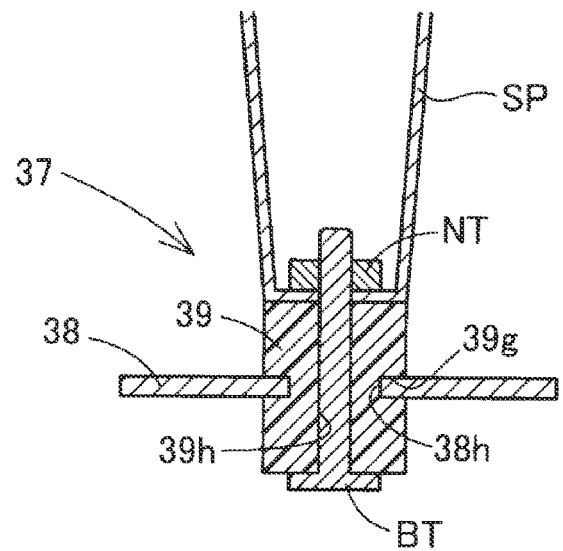
FIG. 20 is a schematic sectional view of a fastener provided on the high-pressure tank of the fifth embodiment.

FIG. 20 is a schematic sectional view of the fastener 37 cut along a line XX-XX in FIG. 19. The plate portion 38 of the fastener 37 has a through hole 38h through which the mount member 39 is attached. The mount member 39 is inserted through the through hole 38h of the plate portion 38. The mount member 39 is fixed to the plate portion 38 by fitting the peripheral edges of the through hole 38h to grooves 39g provided on the outer periphery of the mount member 39. The mount member 39 has a bolt hole 39h passing through the mount member 39 in a thickness direction of the plate portion 38. The fastener 37 is coupled to the support SP by tightening a bolt BT inserted through the bolt hole 39h of the mount member 39 and a nut NT arranged inside the hollow support SP. According to the fastener 37, the mount member 39 can absorb vibration from the support SP. This structure suppresses detachment of the high-pressure tank 10E from the support SP due to a decrease in fixing performance of the fastener 37 by the vibration.

FIG. 21 is a schematic view illustrating an example of a mounting position of the high-pressure tank 10E in a fuel cell vehicle 400. The fuel cell vehicle 400 has a cabin 401, a trunk 402, and a floor panel 405. Occupants are seated in the cabin 401. The trunk 402 is provided behind the cabin 401, and luggage is loaded on the trunk 402. The floor panel 405 serves as floors of the cabin 401 and the trunk 402. The high-pressure tank 10E is mounted below the floor panel 405. A resin cover member 407 is provided below the high-pressure tank 10E. The cover member 407 is coupled to the floor panel 405, and covers the high-pressure tank 10E from the bottom.

The supports SP are coupled to the floor panel 405, extend downward from the floor panel 405, and are coupled to the fasteners 37 of the high-pressure tank 10E. Downward movement of the high-pressure tank 10E is suppressed by coupling the fasteners 37 of the first protective layer 27Ea to the supports SP. Upward movement of the high-pressure tank 10E is restricted by coupling the fasteners 37 of the second protective layers 27Eb to the supports SP.

The high-pressure tank 10E is mounted such that the first protective layer 27Ea faces the cover member 407 and the second protective layers 27Eb face the floor panel 405. Thus, the first protective layer 27Ea having a large coverage area can protect a lower side region of the high-pressure tank 10E, which is susceptible to damage caused by interference with roads or a hit of flying foreign objects such as stones. The second protective layer 27Eb arranged in an upper side region of the high-pressure tank 10E, which is less susceptible to such damage, has a small coverage area. Accordingly, an increase in the weight of the high-pressure tank 10E is suppressed.

The fasteners 37 are provided on both sides of the central axis CX, and are supported by the supports SP in a state in which the high-pressure tank 10E is floating to have spaces above and below the high-pressure tank 10E. The spaces function as buffer regions BF where the high-pressure tank 10E is allowed to expand or contract. When the high-pressure tank 10E expands or contracts, the displacement amount of the central axis CX is reduced as compared to a case where the high-pressure tank 10E is arranged directly on the floor. This structure reduces the occurrence of a case where devices such as a valve and a pipe connected to the high-pressure tank 10E or devices arranged around the high-pressure tank 10E receive loads caused by the displacement of the high-pressure tank 10E when the high-pressure tank 10E expands or contracts. In the fifth embodiment, the buffer region BF is a space. In other embodiments, the buffer region BF may be a region where a member deformable to follow the expansion and contraction of the high-pressure tank 10E is arranged.

In the fifth embodiment, the high-pressure tank 10E is mounted in the region below the trunk 402. In other embodiments, the high-pressure tank 10E may be mounted in a region below the cabin 401. The high-pressure tank 10E need not be mounted below the floor panel 405, but may be mounted in, for example, an engine compartment 408 located in front of the cabin 401. In this case, the fasteners 37 of the high-pressure tank 10E are fixed to the supports SP coupled to a wall in the engine compartment 408.

The high-pressure tank 10E of the fifth embodiment described above has the first protective layer 27Ea and the second protective layer 27Eb having different coverage areas. Therefore, the protectiveness of the high-pressure tank 10E is increased while suppressing the increase in the weight of the high-pressure tank 10E. The protective layers 27Ea and 27Eb are provided with the fasteners 37. Therefore, the high-pressure tank 10E can be fixed easily. According to the high-pressure tank 10E of the fifth embodiment, various actions and effects described in the embodiments above can be attained.

Other Embodiments

For example, various structures described in the embodiments above may be modified as follows. The following other embodiments are regarded as examples of embodiments for implementing the technology disclosed herein similarly to the embodiments described above.

Other Embodiment 1

The fluid stored in each of the high-pressure tanks 10A, 10B, 10C, and 10E of the embodiments described above is not limited to hydrogen. In other embodiments, each of the high-pressure tanks 10A, 10B, 10C, and 10E may store natural gas, liquefied gas, or other fluids. Each of the high-pressure tanks 10A, 10B, 10C, and 10E may be mounted on a natural gas vehicle or other vehicles as well as the fuel cell vehicle. Each of the high-pressure tanks 10A, 10B, 10C, and 10E may be mounted on a moving object other than the vehicle, or may be installed in a building.

Other Embodiment 2

The porous member 30 may have a structure different from those of the tubular mesh member 30A and the sheet mesh members 30B, 30C, 30D, and 30E. For example, the porous member 30 may be formed by knitting wires into a mesh, or may be made of a perforated metal having through holes in a metal sheet. The porous member 30 may be a tubular mesh member in which a mesh member that hardly generates a restoration force when stretched is formed into a tubular shape.

The technology disclosed herein is not limited to the embodiments described above, but may be implemented by various structures without departing from the gist of the technology disclosed herein. For example, the technical features of the embodiments corresponding to the technical features of the respective aspects described in the "SUMMARY" section may be replaced or combined as appropriate to solve a part or all of the problems described above or attain a part or all of the effects described above. Any technical feature may be omitted as appropriate unless otherwise described as being essential herein, as well as technical features described as being inessential herein.

What is claimed is:

1. A method for manufacturing a high-pressure tank, the method comprising:
    preparing a liner having an internal space to store a fluid;
    preparing a porous member having a plurality of pores extending through the porous member in a thickness direction of the porous member;
    winding, around a surface of the liner, fibers impregnated with a thermosetting resin;
    arranging the porous member on the fibers; and
    thermally curing, by heating the liner having the porous member, the thermosetting resin impregnated in the fibers while causing the thermosetting resin to flow into the pores of the porous member;
wherein the porous member includes a tubular mesh member having a mesh that defines the pores and surrounding an outer periphery of the liner,
wherein the tubular mesh member has a stretching property in which a restoration force is generated when the tubular mesh member is stretched; and
wherein the arranging step comprises
    attaching the tubular mesh member to an attachment device,
    inserting the liner having the fibers wound along a central axis of the attachment device into the tubular mesh member, and
    increasing the diameter of the tubular mesh member by the attachment device.

2. The method of claim 1, where the attachment device comprises shafts and the method further comprises attaching the tubular mesh member to the attachment device by inserting the shafts into the tubular mesh member.

* * * * *